(12) United States Patent
Corkum et al.

(10) Patent No.: US 10,213,923 B2
(45) Date of Patent: Feb. 26, 2019

(54) ROBOTIC ARM SYSTEM AND OBJECT AVOIDANCE METHODS

(71) Applicant: Carbon Robotics, Inc., San Francisco, CA (US)

(72) Inventors: Daniel Corkum, San Francisco, CA (US); Rosanna Myers, San Francisco, CA (US)

(73) Assignee: Carbon Robotics, Inc., San Francisco, CA (US)

(*) Notice: Subject to any disclaimer, the term of this patent is extended or adjusted under 35 U.S.C. 154(b) by 204 days.

(21) Appl. No.: 15/260,451

(22) Filed: Sep. 9, 2016

(65) Prior Publication Data

US 2017/0066130 A1    Mar. 9, 2017

Related U.S. Application Data

(60) Provisional application No. 62/216,328, filed on Sep. 9, 2015.

(51) Int. Cl.
| | |
|---|---|
| *B25J 9/00* | (2006.01) |
| *B25J 9/16* | (2006.01) |
| *B23K 26/08* | (2014.01) |
| *B23K 26/38* | (2014.01) |
| *B23K 101/18* | (2006.01) |

(52) U.S. Cl.
CPC ......... *B25J 9/1651* (2013.01); *B23K 26/0884* (2013.01); *B23K 26/38* (2013.01); *B25J 9/1664* (2013.01); *B23K 2101/18* (2018.08); *G05B 2219/40454* (2013.01); *G05B 2219/40519* (2013.01)

(58) Field of Classification Search
USPC .................................. 700/245–264
See application file for complete search history.

(56) References Cited

U.S. PATENT DOCUMENTS 3,543,910 A * 12/1970 Martin ................ B25J 5/04
                                                        198/341.08
4,453,085 A *  6/1984 Pryor ................ B25J 18/002
                                                        250/203.1

(Continued)

FOREIGN PATENT DOCUMENTS

WO    2014110682 A1    7/2014

*Primary Examiner* — Jonathan L Sample
(74) *Attorney, Agent, or Firm* — Run8 Patent Group, LLC; Peter Miller

(57) ABSTRACT

One variation of a method for controlling a robotic arm includes: moving the robotic arm through a trajectory; at a first time in which the robotic arm occupies a first position along the trajectory, measuring a first capacitance of a first sense circuit comprising a first electrode extending over a first arm segment of the robotic arm; at a second time in which the robotic arm occupies a second position along the trajectory, measuring a second capacitance of the first sense circuit; calculating a first rate of change in capacitance of the first sense circuit based on a difference between the first capacitance and the second capacitance; in response to the first rate of change in capacitance of the first sense circuit exceeding a threshold rate of change, issuing a proximity alarm; and reducing a speed of the robotic arm moving through the trajectory in response to the proximity alarm.

20 Claims, 6 Drawing Sheets

(56) References Cited

U.S. PATENT DOCUMENTS

| | | | | |
|---|---|---|---|---|
| 5,166,679 A * | 11/1992 | Vranish | B25J 13/086 324/687 |
| 5,227,930 A * | 7/1993 | Thanos | G11B 5/59677 360/77.03 |
| 5,535,306 A * | 7/1996 | Stevens | B25J 9/1692 700/254 |
| 5,946,449 A * | 8/1999 | Dickerson | B25J 9/1697 700/250 |
| 6,060,022 A * | 5/2000 | Pang | G01N 35/0095 422/63 |
| 6,070,109 A * | 5/2000 | McGee | B25J 9/1692 700/254 |
| 6,308,113 B1 * | 10/2001 | Nowlin | B25J 9/1689 700/245 |
| 6,408,224 B1 * | 6/2002 | Okamoto | B25J 9/1661 29/721 |
| 6,949,938 B2 * | 9/2005 | Chen | G01D 3/08 324/658 |
| 7,548,075 B2 * | 6/2009 | Somers | A61B 6/102 324/658 |
| 7,987,021 B2 * | 7/2011 | Takaoka | B25J 9/1676 345/419 |
| 7,993,289 B2 * | 8/2011 | Quistgaard | A61B 5/6843 601/2 |
| 8,426,761 B2 * | 4/2013 | Takahashi | B23K 11/115 219/110 |
| 8,527,094 B2 * | 9/2013 | Kumar | G09B 23/28 700/259 |
| 8,633,715 B2 * | 1/2014 | Lenz | H03K 17/955 324/658 |
| 8,786,613 B2 * | 7/2014 | Millman | G06T 13/20 345/473 |
| 9,162,359 B2 * | 10/2015 | Suyama | B25J 9/1676 |
| 2002/0088776 A1 * | 7/2002 | Nakano | H01J 37/32082 219/121.43 |
| 2002/0128552 A1 * | 9/2002 | Nowlin | A61B 34/70 600/427 |
| 2002/0157608 A1 * | 10/2002 | Nakano | C23C 16/52 118/723 MW |
| 2005/0159840 A1 * | 7/2005 | Lin | B23P 6/002 700/245 |
| 2006/0036351 A1 * | 2/2006 | Hopkins | G05B 11/42 700/280 |
| 2006/0097734 A1 * | 5/2006 | Roziere | A61B 6/102 324/662 |
| 2007/0067678 A1 * | 3/2007 | Hosek | G05B 23/0235 714/25 |
| 2007/0281149 A1 * | 12/2007 | Martens | C09J 5/00 428/336 |
| 2009/0058208 A1 * | 3/2009 | Kimura | H02K 5/1732 310/83 |
| 2010/0234857 A1 * | 9/2010 | Itkowitz | G09B 23/285 606/130 |
| 2010/0300230 A1 * | 12/2010 | Helmer | B25J 9/106 74/469 |
| 2011/0190933 A1 * | 8/2011 | Shein | B62D 55/075 700/258 |
| 2012/0012101 A1 * | 1/2012 | Trujillo | F24S 30/452 126/601 |
| 2012/0022689 A1 * | 1/2012 | Kapoor | B25J 9/1666 700/255 |
| 2012/0133318 A1 * | 5/2012 | Komatsu | B25J 9/1075 318/563 |
| 2012/0143212 A1 * | 6/2012 | Madhani | B25J 9/1615 606/130 |
| 2012/0197439 A1 * | 8/2012 | Wang | B25J 9/1689 700/259 |
| 2012/0239198 A1 * | 9/2012 | Orita | B25J 9/1641 700/260 |
| 2013/0096862 A1 * | 4/2013 | Nakamura | G01D 5/347 702/94 |
| 2013/0342224 A1 * | 12/2013 | Frangen | B25J 13/086 324/679 |
| 2013/0345876 A1 * | 12/2013 | Rudakevych | B25J 9/1697 700/259 |
| 2014/0031983 A1 * | 1/2014 | Low | B25J 9/0087 700/257 |
| 2014/0058406 A1 * | 2/2014 | Tsekos | A61B 34/30 606/130 |
| 2014/0180478 A1 * | 6/2014 | Letsky | E01H 5/098 700/258 |
| 2014/0200713 A1 * | 7/2014 | Allen | B25J 11/009 700/253 |
| 2014/0201571 A1 * | 7/2014 | Hosek | G06F 11/2257 714/26 |
| 2014/0277730 A1 * | 9/2014 | Nakamura | B25J 13/088 700/258 |
| 2014/0277847 A1 * | 9/2014 | Cann | B25J 5/007 701/2 |
| 2015/0019013 A1 * | 1/2015 | Rose | G01L 1/16 700/258 |
| 2015/0157410 A1 | 6/2015 | Kilroy et al. | |
| 2015/0198467 A1 * | 7/2015 | Nakamura | G01D 5/34715 250/231.14 |
| 2015/0286211 A1 * | 10/2015 | Sticht | B25J 9/1692 700/258 |

\* cited by examiner

ROBOTIC ARM SYSTEM AND OBJECT AVOIDANCE METHODS

CROSS-REFERENCE TO RELATED APPLICATIONS

This application claims the benefit of U.S. Provisional Application No. 62/216,328, filed on 9 Sep. 2015, which is incorporated in its entirety by this reference.

TECHNICAL FIELD

This invention relates generally to the field of robotic arms and more specifically to a new and useful robotic arm system and object avoidance methods in the field of robotic arms.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Robotic Arm System

Figure 1:
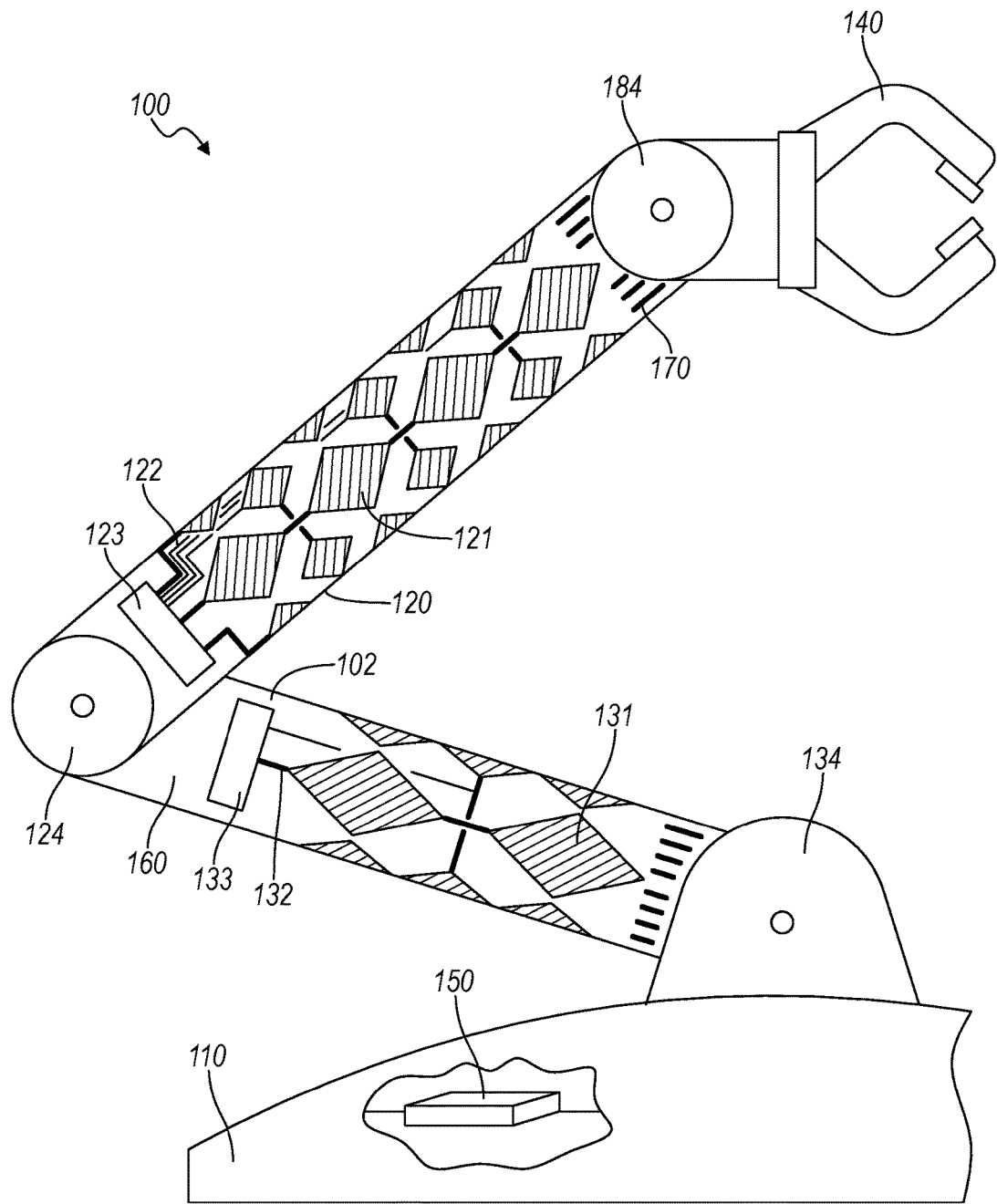
FIG. 1 is a schematic representation of a robotic arm system.

As shown in FIG. 1, a robotic arm 102 system includes: a base 110; a first arm segment 120 coupled to the base 110 via a first actuatable axis 124; a second arm segment 130 coupled to the base 110 via a second actuatable axis 134; a set of electrodes 121, 131 arranged across the first arm segment 120 and the second arm segment 130; a controller 123 accumulating a first set of capacitance values of electrodes in the set of electrodes during a first sampling period and accumulating a second set of capacitance values of electrodes in the set of electrodes during a second sampling period succeeding the first sampling period; a processor 150 determining a first proximity of an object to the robotic arm 102 during the first sampling period based on the first set of capacitance values received from the controller 123, determining a second proximity of the object to the robotic arm 102 during the second sampling period based on the second set of capacitance values received from the controller 123, and setting a reduced maximum speed of the first actuatable axis 124 and a reduced maximum speed of the second actuatable axis 134 following the second sampling period based on the second proximity and a difference between the first proximity and the second proximity.

One variation of the system 100 includes: a base 110; a first arm segment 120; a second arm segment 130 interposed between the base 110 and the first arm segment 120, coupled to the first arm segment 120 via a first actuatable axis 124, and coupled to the base 110 via a second actuatable axis 134; an end effector 140 coupled to an end of the first arm segment 120 opposite the first actuatable axis 124; a first electrode 121 arranged across a region of the first arm segment 120 and electrically coupled to a first sense circuit 122; and a controller 123 configured to measure capacitance of the first sense circuit 122 during actuation of the first actuatable axis 124 and the second actuatable axis 134.

2. Method

Figure 4:
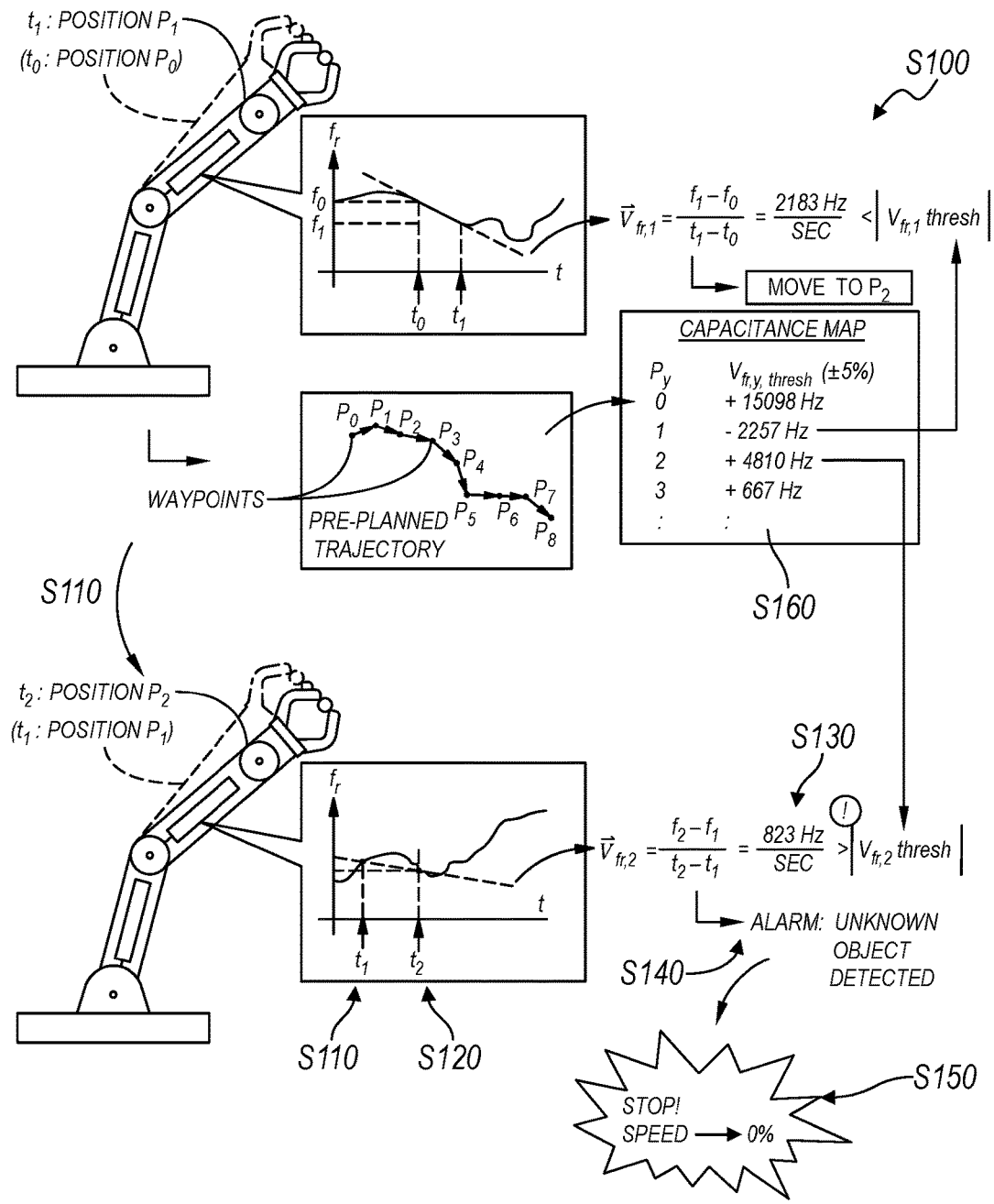
FIG. 4 is a flowchart representation of a method.

As shown in FIG. 4, the system 100 can execute a method for controlling a robotic arm 102, including: moving the robotic arm 102 through a trajectory in Block S110; at a first time in which the robotic arm 102 occupies a first position along the trajectory, measuring a first capacitance of a first sense circuit 122 comprising a first electrode 121 extending over a first arm segment 120 of the robotic arm 102 in Block S120; at a second time in which the robotic arm 102 occupies a second position along the trajectory, the second time succeeding the first time, measuring a second capacitance of the first sense circuit 122 in Block S122; calculating a first rate of change in capacitance of the first sense circuit 122 based on a difference between the first capacitance and the second capacitance in Block S130; in response to the first rate of change in capacitance of the first sense circuit 122 exceeding a threshold rate of change, issuing a proximity alarm in Block S140; and reducing a current speed of the robotic arm 102 moving through the trajectory in response to the proximity alarm in Block S150.

3. Applications

Generally, the system 100 defines a robotic arm 102 that includes a set of rigid arm segments and a set of actuatable axes—interspersed between rigid arm segments—that can be actuated to manipulate the robotic arm 102 within a space. The set of rigid arm segments and actuatable axes can be mounted to a base on one end and coupled to an end effector on an opposite end, and the system 100 can drive each actuatable axis according to a prerecorded or pre-generated motion program (or "trajectory," or toolpath) to perform a defined task. For example, the system 100 can include a motorized gripper end effector transiently coupled to the end of the robotic arm 102 opposite the base 110, and the system 100 can navigate the robotic arm 102 through a preplanned trajectory and execute an end effector actuation routine to select an object from a parts bin and to place the object onto an assembly. In another example, the system 100 can include a polymer extrusion end effector and execute a trajectory to print an object with material dispensed from the polymer extrusion end effector. In yet another example, the system 100 can include a laser cutter end effector and execute a trajectory to cut a two-dimensional shape from a sheet of material stock while the laser cutter end effector is active.

The system 100 also includes: a set of electrodes arranged within or on one or more arm segments of the robotic arm 102; and one or more controllers configured to selectively read capacitance values of the electrodes (or capacitances of sense circuits coupled to these electrodes) while the system 100 is in operation. For example, the controller 123 can sequentially drive a set of sense circuits coupled to electrodes on the robotic arm 102 and implement self-capacitance sensing techniques to record leakage current through each sense circuit. Alternatively, the controller 123 can selectively ground single ground electrode channels and drive (perpendicular) sense electrode channels in an array of ground and sense electrodes patterned across an arm segment and then implement mutual-capacitance sensing techniques to measure charge/discharge times, resonant frequencies, or other capacitance values for each ground/sense electrode junction accordingly. For example, the system 100 can include an electrode patterned across an arm segment to form a plate of capacitors within an LC tank sense circuit, and the controller 123 can measure a resonant frequency of the LC tank sense circuit. The controller 123 can then pass these capacitance-related data to the processor 150.

The processor can transform these data into: presence of an object near the robotic arm 102 or to a particular region of an arm segment within the robotic arm 102; a position of an object relative to the system 100, such as relative to a reference point on the base 110; and/or whether a nearby object is moving toward the robotic arm 102 or whether the robotic arm 102 is moving toward the object. As the robotic arm 102 moves from a first position to a second position, the processor 150 can additionally or alternatively determine whether a rate of change in capacitance of an electrode (or sensor circuit coupled to the electrode) on a segment of the robotic arm 102 differs from an expected rate of change in capacitance from the first position to the second position and identify presence of a new object within a three-dimensional volume reachable by the end effector 140 (hereinafter an "operating volume") accordingly.

The processor 150 can then set motion limits—such as maximum speeds of each actuatable axis or positional (e.g., angular position) bounds on each actuatable axis—to avoid impact with such an object or to limit an impact with the object to a substantially minimal speed, such as if a user's hand is moving toward the robotic arm 102. In particular, the system 100 can execute Blocks of the method in real-time while the robotic arm 102 is in motion to sense changes within the operating volume—such as presence of a new static or dynamic object within the operating volume—and to set speed limits for actuation of the robotic arm 102 or stop motion of the robotic arm 102 altogether when a change in the operating volume is detected.

The processor 150 can also modify a trajectory under execution by the system 100 based on the presence of a new object near the robotic arm 102, such as determined from deviations in the rate of change in capacitance of a sense circuit over a baseline or anticipated rate of change in capacitance. The system 100 can therefore include: a robotic arm 102 containing one or more rigid arm segments manipulated by one or more actuatable axes; one or more electrodes arranged over the arm segments; a controller can sample the electrodes (or sensor circuits coupled to the electrodes) according to self- and/or mutual-capacitance techniques, and the system 100 can manipulate data received from these electrodes to avoid impact with nearby objects while in motion.

The system 100 is described herein as reading capacitance values of one or more electrodes arranged on an arm segment of a robotic arm 102. In particular, the system 100 can read a total charge/discharge time, a charge time, a discharge time, a resonant frequency, an RC time constant, and/or an LC time constant, etc. of a sense circuit containing an electrode. The system 100 can then transform one capacitance value read from the sense circuit into an estimated distance or distance range between the arm segment and an object nearby and issue a proximity alarm if an estimated distance between an object and the robotic arm 102 falls below a threshold distance, such as a static threshold distance of twelve inches or a dynamic threshold distance based on the current speed of the robotic arm 102. The system 100 can additionally or alternatively: calculate a rate of change in capacitance value (e.g., a rate of change in resonant frequency) of a sense circuit between two positions occupied by the robotic arm 102 during its motion along a preplanned trajectory; determine if a new object (i.e., an unanticipated object) is near the robotic arm 102 if the actual rate of change in capacitance of the sense circuit deviates from a baseline or expected rate of change between the same two positions along the preplanned trajectory; and issue a proximity alarm if presence of a new object is determined. The system 100 can then modify motion of the robotic arm 102 along its current trajectory responsive to a proximity alarm, such as by reducing the maximum allowable speed of each actuatable axis or stopping motion of the robotic arm 102 altogether.

4. Robotic Arm 102 and Arm Segments

The system 100 can define a robotic arm 102 that includes: a base; an end effector or end effector junction 182 configured to transiently engage an end effector; multiple rigid sections (or "arm segments") arranged in series between the base 110 and the end effector 140 or end effector junction 182; and an actuatable axis interposed between the base 110 and a nearest arm segment and between each arm segment. Each actuatable axis can include an internal actuator, such as a servo motor; alternatively, each actuatable axis can be coupled to an actuator arranged in the base 110, such as via a set of cables or linkages. When the actuator of an actuatable axis is driven, such as by a motor driver arranged in the base 110 and controlled by the processor 150, the relative angular position of two ends of the actuatable axis can change, thereby moving an arm segment on one side of the actuatable axis relative to an arm segment (or relative to the base 110) on the other end of the actuatable axis. An actuatable axis can also include one or more position sensors, such as an optical encoder and a pair of limit switches, and the processor 150 can sample these position sensors to track the relative positions of two arm segments (or an arm segment and the base 110) on each side of the actuatable axis.

The processor 150 can execute Block S110 of the method, which recites moving the robotic arm 102 through a trajectory, by controlling various motor drivers to actuate each actuatable axis. For example, the processor 150 can: load a three-dimensional preplanned trajectory defining waypoints along a target path for traversal by the end effector 140 through space; calculate a target position for each actuatable axis at each waypoint; and then implement closed-loop controls to navigate the robotic arm 102 sequentially through each waypoint along the preplanned trajectory based on positions read from position sensors in each actuatable axis.

During execution of a trajectory, the processor 150 can cooperate with the controller 123 to execute other Blocks of the method substantially in real-time to detect changes in the operating volume occupied by the robotic arm 102—such as new (i.e., unknown) static objects within the operating volume or dynamic objects moving through the operating volume (e.g., an operators hand)—and to cease or modify motion of the robotic arm 102 accordingly.

5. Sense Electrodes

The system includes a first electrode arranged across a region of the first arm segment 120 and electrically coupled to a first circuit. Generally, the system 100 includes electrodes arranged across an arm segment of the robotic arm 102 and connected to a sense circuit exhibiting a measurable characteristic that changes proportionally (e.g., linearly, logarithmically, inversely, etc.) with distance between the electrode and a massive object nearby. The controller 123 can read this measurable characteristic—such as total charge/discharge time, a charge time, a discharge time, a resonant frequency, an RC time constant, or an LC time constant (hereinafter "capacitance value")—of the sense circuit over time, and the processor 150 can analyze these measurable characteristics to selectively trigger proximity alarms, as described below.

For example, the system 100 can include: a sense electrode and a ground electrode pair that are both arranged on an arm segment to form a capacitor; an inductor electrically coupled to the sense and ground electrodes to form the sense circuit; and a signal generator coupled to the sense circuit. The controller 123 can then: set the signal generator to drive the sense circuit at a baseline frequency (e.g., a typical resonant frequency of the sense circuit), read the voltage over the sense circuit, vary the output frequency of the signal generator until a maximum voltage over the circuit is reached, and then store this final output frequency as the resonant frequency of the sense circuit.

53.1 Electrode Array

Figure 2:
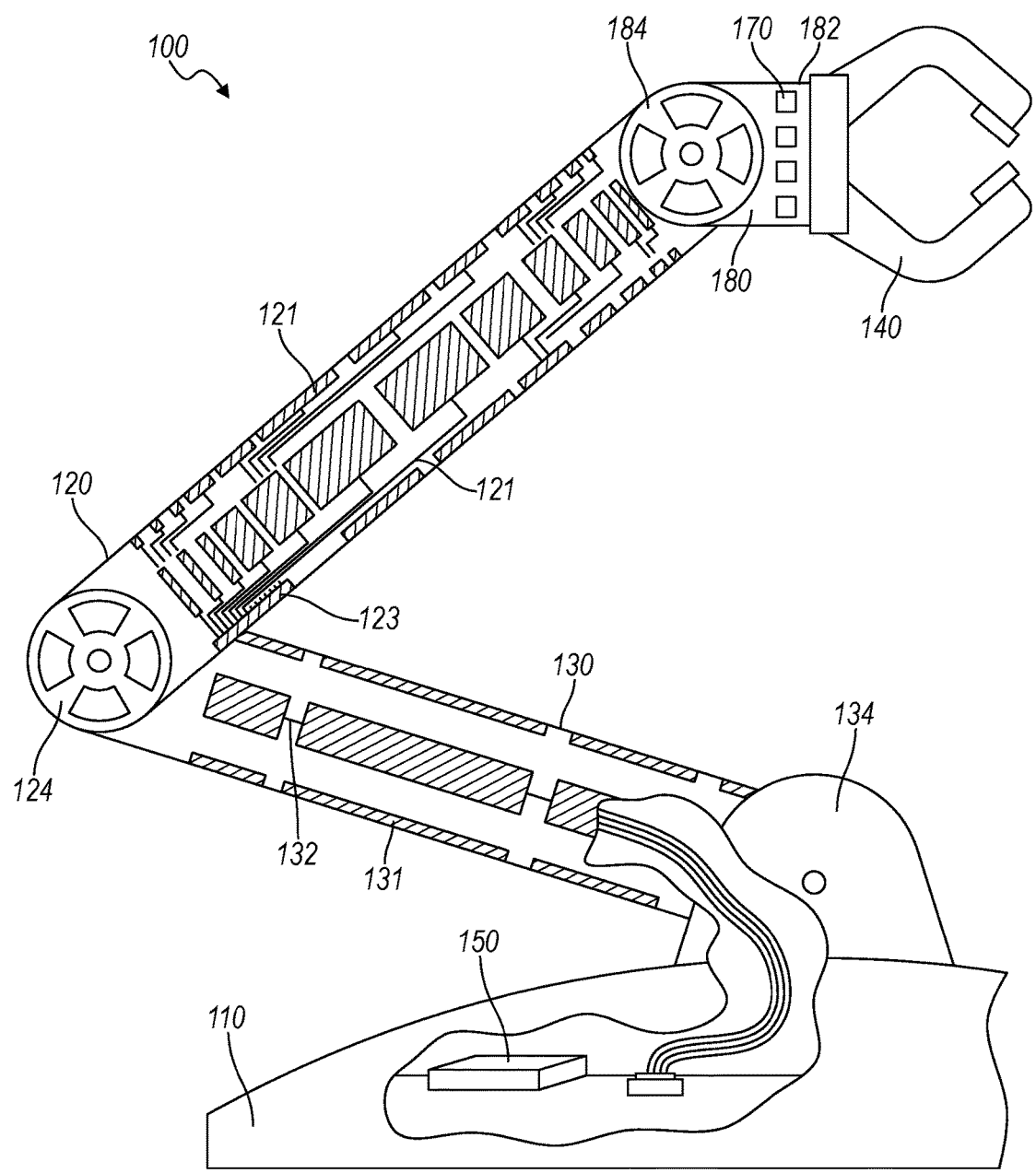
FIG. 2 is a schematic representation of one variation of the robotic arm system.

The system 100 can also include multiple electrodes (with a common ground electrode or paired with unique ground electrodes) and sense circuits on one or more arm segments within the robotic arm 102. In one implementation, an arm segment includes a set of sense electrodes arranged across the arm segment in a projected self-capacitance array (a "sense electrode array"). In this implementation, the sense electrode array can include: a first linear array of electrodes on the dorsal side of an arm segment, a second linear array of electrodes on the right-lateral side of the arm segment, a third linear array of electrodes on the ventral side of the arm segment, and a fourth linear array of electrodes on the left-lateral side of the arm segment, as shown in FIG. 2. Each linear array of electrodes can include four (relatively) large electrodes arranged in a line parallel to the axis of the arm segment. For example, for a 12"-long arm segment defining a 1"-outside diameter cylindrical section, each linear array of electrodes can be printed or otherwise applied to the outer surface of the arm segment, wherein each electrode is 1.5" in length (i.e., along the axis of the arm segment), is offset from an adjacent electrode in the same linear array by a center-to-center distance of 2", and spans a radial distance of ~80° about the exterior surface of the arm segment, and each of the four electrodes in each linear array can be electrically connected to one channel on the controller 123 via a relatively thin (e.g., 0.05"-wide) trace. In this example, each linear array of electrodes can be radially offset from an adjacent linear array by 90°. The controller 123 and the processor 150 can then cooperate to scan each electrode in each linear array on the arm segment in series, detect changes in capacitance values (e.g., current draw) in select electrodes across two or more sampling periods, and correlate these changes in capacitance values with proximity of an object to select electrodes.

In the foregoing implementation, the processor 150 can thus determine if an object is approaching the dorsal, ventral, left-lateral, or right-lateral side of an arm segment (or if the dorsal, ventral, left-lateral, or right-lateral side of the arm segment is approaching an object) and whether the object is approaching the arm segment from the rear, center, or front of the arm segment based on known positions of electrodes exhibiting greatest changes in capacitance (e.g., deviations from expected rate of change in resonant frequency) from one sampling position or position of the robotic arm 102 to the nest. The processor 150 can also interpolate capacitance value changes between radially-offset electrodes on an arm segment to determine if an object is approaching the left-dorsal, right-dorsal, left-ventral, or right-ventral side of the arm segment (or if the left-dorsal, right-dorsal, left-ventral, or right-ventral side of the arm segment is approaching the object) or any other angular resolution. The processor 150 can similarly interpolate changes in capacitance value between linearly-offset electrodes along one linear array of electrodes to estimate a point on the arm segment nearest an approaching object. However, in this implementation, an arm segment can include any other number or configuration of electrodes of any other geometry.

In another implementation, an arm segment includes a set of sense electrodes arranged in a projected mutual-capacitance array including: a first linear array of sense electrodes on the dorsal side of an arm segment, a second linear array of sense electrodes on the right-lateral side of the arm segment, a third linear array of sense electrodes on the ventral side of the arm segment, and a fourth linear array of sense electrodes on the left-lateral side of the arm segment; a first linear array of ground electrodes on the right-dorsal side of the arm segment, a second linear array of ground electrodes on the right-ventral side of the arm segment, a third linear array of ground electrodes on the left-ventral side of the arm segment, and a fourth linear array of ground electrodes on the left-dorsal side of the arm segment; and a layer of non-conductive dielectric material interposed between the linear arrays of sense electrodes and the linear arrays of ground electrodes.

In the foregoing implementation, the linear array of sense electrodes can include four large diamond-shaped sense electrodes arranged in a line parallel to the axis of the arm segment, and each linear array of ground electrodes can include three large diamond-shaped ground electrodes arranged in a line parallel to the axis of the arm segment and patterned between adjacent linear arrays of sense electrodes, as shown in FIG. 1. In each array of sense electrodes, the four sense electrodes can be electrically connected in series, and one sense electrode in the array can be electrically connected to one channel on the controller 123 via a trace of similar geometry. Similarly, in each array of ground electrodes, the three ground electrodes can be electrically connected in series, and one ground electrode in the array can be electrically connected to one port on the controller 123 via a trace of similar geometry.

In one example, for a 12"-long arm segment defining a cylindrical cross-section 1" in external diameter, each linear array of sense electrodes can be printed or otherwise applied to the outside surface of the arm segment, wherein each sense electrode is 1.5" in maximum corner-to-corner length along the axis of the arm segment, is offset from an adjacent sense electrode in the same linear array by a center-to-center distance of 2", and spans a radial distance of ~80° about the exterior surface of the arm segment. In this example, each linear array of sense electrodes can be radially offset from an adjacent linear array by 90°. In this example, the first, second, third, and fourth linear arrays of ground electrodes can define ground electrodes of similar geometry, can be radially offset 45° from adjacent arrays of sense electrodes, and can be shifted longitudinally along the arm segment by 1" relative to the linear arrays of sense electrodes to center linear arrays of ground electrodes between adjacent arrays of sense electrodes, as shown in FIG. 1. The controller 123 and the processor 150 can then cooperate: to scan adjacent ground/sense electrode pairs across the arm segment; to detect changes in capacitance values (e.g., changes in RC or LC time constant, changes in charge/discharge rate, etc.) in select electrode pairs across two or more sampling periods; and to correlate these changes in capacitance values with proximity of an object to particular electrode pairs. The processor 150 can then implement methods and techniques described above to determine if an object is approaching the arm segment (or if the arm segment is approaching an object) and a particular region on the arm segment that is nearest the object.

In the foregoing implementations, electrodes of substantially similar geometries can be printed, installed, or otherwise fixed to an arm segment in substantially uniform linear and/or radial patterns and connected to the controller 123 in parallel (e.g., for projected self-capacitance configurations) or in series (e.g., for projected mutual-capacitance configurations). Generally, the system 100 can include a substantially uniform density of electrodes patterned over the arm segment. For example, the set of sense electrodes can include sense electrodes of substantially similar diamond-shaped geometries, spaced longitudinally along the arm segment at a uniform center-to-center linear offset, and spaced radially about the arm segment at a uniform center-to-center angular offset. In this example, the set of ground electrodes can include ground electrodes of similar geometries and spaced according to substantially uniform longitudinal and radial offsets.

Alternatively, electrodes can be printed, installed, or otherwise coupled to an arm segment in non-uniform patterns (e.g., at varying longitudinal and radial offsets). In particular, the system 100 can include a non-uniform density of electrodes and/or a set of electrodes of non-uniform size and/or geometry patterned across an arm segment. In one example implementation, a posterior end of the first arm segment 120 is connected to the base 110 via a first driven axis, and a posterior end of the second arm segment 130 is connected to the anterior end of the first arm segment 120 via a second driven axis. In this example implementation, a first set of electrodes is patterned across the first arm segment 120 at a first electrode density (in the radial and/or longitudinal dimensions) proximal the posterior end of the first arm segment 120 and transitioning to a second electrode density proximal the anterior end of the first arm segment 120, the second electrode 131 density greater than the first electrode 121 density. In this example implementation, a second set of electrodes is similarly patterned across the second arm segment 130 at a third electrode density proximal the posterior end of the second arm segment 130 and transitioning to a fourth electrode density proximal the anterior end of the second arm segment 130, the fourth electrode density greater than the third electrode density, which can be greater than the second electrode 131 density. In this example, as the density of electrodes along an arm segment increases, the size (e.g., the area) of electrodes can decrease accordingly, as shown in FIG. 2. The system 100 can therefore include a set of multiple discrete electrodes arranged in an electrode pattern characterized by greater electrode densities at greater distances from the base 110. The system 100 can thus detect objects at greater distances from the system 100 proximal the base 110 by sampling larger, lower density electrodes proximal the base 110 (though at relatively low positional resolution); and the system 100 can also detect nearer objects with greater positional and directional sensitivity by sampling higher-density clusters of smaller electrodes proximal the distal end of the robotic arm 102.

In another example implementation, a set of electrodes is patterned across an arm segment at a first electrode density (in the radial and/or longitudinal dimensions) proximal the longitudinal center of the arm segment and transitioning to a second electrode density proximal the anterior and posterior ends of the arm segment, the second electrode 131 density greater than the first electrode 121 density, as shown in FIG. 2. In this example implementation, the system 100 can include a set of multiple discrete electrodes arranged in an electrode pattern characterized by greater electrode density at greater distances from the longitudinal center of an arm segment. The system 100 can thus detect distant objects approaching the arm segment (or a distant object that the arm segment is approaching) by sampling a lower-density cluster of larger electrodes proximal the longitudinal center of the arm segment; and the system 100 can also detect nearer objects approaching the arm segment (or a distant object that the arm segment is approaching) with greater positional and directional sensitivity by sampling a higher-density cluster of smaller electrodes proximal the longitudinal ends of the arm segment.

In the foregoing implementation, smaller electrodes arranged in higher-density patterns proximal one or both ends of an arm segment can function as proximity sensors and/or as control sensors. In particular, the controller 123 and the processor 150 can cooperate to sample and process outputs from these smaller electrodes to identify nearby objects (e.g., within a range of up to 1" from an electrode); as the object nears the arm segment (or as the arm segment nears the object) and then touches the arm segment proximal a smaller electrode, the controller 123 and/or processor can continue to detect the presence and position of the object on the arm segment based on capacitance values read from these control electrodes following contact with the object. The processor 150 can then correlate a position or change in position of the object (e.g., a finger) on the arm segment with a control function, such as to manipulate an end effector or to lock or release an actuatable axis between two arm segments, as described below.

Figure 3:
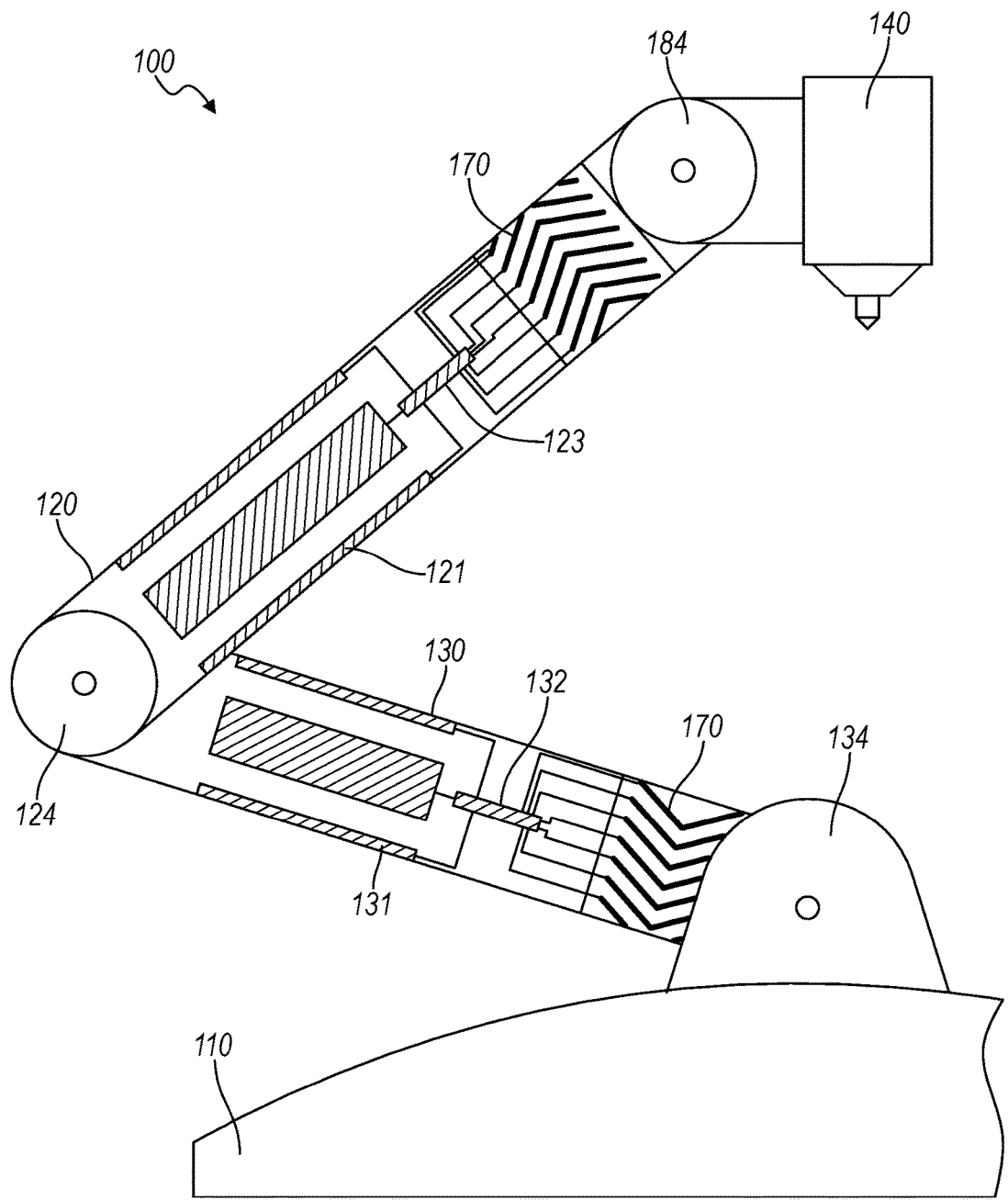
FIG. 3 is a schematic representation of one variation of the robotic arm system.

Alternatively, the system 100 can include a first set of electrodes configured to detect proximity of an object near an arm segment and a second set of electrodes configured to detect control inputs on the surface of the arm segment. In this implementation, the first set of electrodes can define a first electrical circuit controlled by a first controller, and the second set of electrodes can define a second circuit distinct from the first sense circuit 122 and controlled by a second distinct controller. In one example, an arm segment 12" in length and 1" in diameter includes a set of four 9"-long, 80°-wide sense electrodes, including one sense electrode arranged on each of the dorsal, ventral, left-lateral, and right-lateral sides of the arm segment, extending from the posterior end of the arm segment (i.e., nearest the base 110), and terminating 3" from the anterior end of the arm segment; the first controller can thus sample each of the four sense electrodes in series and pass collected capacitance data to the processor 150, and the processor 150 can manipulate these data substantially in real-time to determine if an object is approaching the arm segment and/or if the arm segment is approaching an object, as described below. In this example, the arm segment can also include a second set of (e.g., 20) 2"-long, 0.5"-wide, 0.1"-trace-width, chevron-shaped control electrodes patterned radially about the distal end of the arm segment in a nested configuration between the first set of sense electrodes and the anterior end of the arm segment, as shown in FIG. 3. The controller 133 can thus sample the second set of control electrodes in series (e.g., according to projected self-capacitive sensing techniques) and pass collected capacitance data to the processor 150, and the processor 150 can manipulate these data substantially in realtime to determine if an object in contact with the distal end of the arm segment is moving clockwise or counterclockwise about the arm segment and/or if the object is moving toward the anterior end or toward the posterior end of the arm segment, as described below.

In the foregoing implementation, an arm segment can include a similar set of control electrodes along its proximal end (i.e., adjacent its posterior end nearest the base 110). However, arm segments within the robotic arm 102 can include the same or different combinations of sense and control electrode 170 geometries arranged in any other suitable pattern. The processor 150 can process data received from the sense electrodes and from the control electrodes: 1) to adjust the speed and/or direction of each arm segment during execution of a trajectory based on detected proximity of an object to the robotic arm 102 and/or 2) to manipulate various actuatable axes within the system 100 based on detected deliberate contact with arm segments within the robotic arm 102, respectively, as described below.

5.2 Single Electrode

In an alternative variation, rather than an array of multiple electrodes, an arm segment includes a single electrode. For example, an arm segment can include a single sense electrode arranged circumferentially about and extending along the length of the arm segment, and a controller coupled to the single sense electrode can output a signal representative of proximity of an object to the arm segment generally. In another example, the arm segment can include a single rectangular sense electrode extending along the dorsal side of the arm segment, and a controller coupled to this lone rectangular sense electrode can output a signal representative of proximity of an object to the dorsal side of the arm segment.

5.3 Additional Electrodes

In one variation, the system 100 further includes: an end effector; one or more sense and/or control electrodes arranged on the end effector 140; and an end effector controller configured to read capacitance values from electrodes arranged on, arranged within, or integrated into the structure of the end effector 140. In this variation, the system 100 can further include an end effector junction 182 at the end of the robotic arm 102 (e.g., at the distal end of the second arm segment 130) configured to transiently engage an end effector; the end effector 140 junction can also include a sensor plug (or receptacle) configured to mate with a sensor receptacle (or sensor plug) in the end effector 140 and coupled to the processor 150 via hookup wires (e.g., a ribbon cable) extending from the end effector 140 junction receptacle to the base 110. The end effector 140 controller and the processor 150 can implement methods and techniques similar to those described below to detect and respond to an object approaching the end effector 140 (or an object approached by the end effector 140) during operation of the robotic arm 102, such as during execution of a preplanned trajectory.

Each actuatable axis can similarly include one or more sense and/or control electrodes. These electrodes can be coupled to and read by a controller in an adjacent arm segment, or each actuatable axis can include a dedicated controller that reads capacitance values of electrodes in the same actuatable axis and that communicates these capacitance values to the processor 150, and the processor 150 can implement methods and techniques similar to those described below to detect and respond to an object approaching an actuatable axis (or an object approached by the actuatable axis) during operation.

6. Ground-Plane Electrode

In one variation, the system 100 also includes a ground-plane electrode arranged under the sense, ground, and/or control electrode 170 layers described above. In this variation, the ground-plane electrode can be arranged under and extend across the sense, ground, and/or control electrode 170 layers (i.e., opposite the exterior surface of the arm segment). In one example implementation, the ground-plane electrode is integrated into or physically coextensive with the structure of the arm segment (or with an aesthetic cover or non-structural housing installed over the arm segment). For example, the arm segment can include a rigid composite carbon fiber/epoxy structure with one or more carbon fiber layers connected to a ground channel of a controller installed on the arm segment. Alternatively, the arm segment can include a discrete conductive layer printed or otherwise applied to the arm segment, as described below.

In one implementation, an arm segment includes an aesthetic cover arranged over a rigid beam connected on each end to an actuatable axis; and the aesthetic cover includes a ground plane electrode 160 arranged across (e.g., printed, deposited, or applied to) the interior surface of the aesthetic cover and one or more sense, ground, and/or control electrodes arranged across the exterior surface of the aesthetic cover. In this implementation, the controller 123 can drive the ground electrode to a reference electric ground potential, such as an alternating reference electric ground potential. Furthermore, in this implementation, a housing arranged over the base 110, the end effector 140, and other elements within the robotic arm 102 can include a ground plane electrode 160 under or adjacent sense, ground, or control electrodes; and one or more controllers within the system 100 can drive each ground plane electrode 160 to a common reference electric ground potential.

7. Electrode Integration

In one variation, electrodes are integrated into the structure of an arm segment. For example, an arm segment can include a composite woven carbon fiber and epoxy tube (e.g., a hollow cylinder), and select fibers within the tube can be electrically isolated from other fibers within the tube and connected to ports on a controller to form a set of discrete electrodes. In another example, the structure of an arm segment is formed by wrapping uni- and/or multi-direction woven carbon fiber leafs around a mandrel. In this example, woven carbon fiber patches sandwiched between two non-conductive layers (e.g., two sheets of paper) are applied over a first set of carbon fiber leafs installed on the mandrel, leads (e.g., copper wires) are connected to each carbon fiber patch, and the carbon fiber patches are then covered by a second set of carbon fiber leafs. Once epoxy in the carbon fiber wrap is cured, the mandrel is removed and the leads are connected to corresponding ports on a controller.

In a similar example, electrodes are cut from conductive foil (e.g., by die cutting, laser cutting, etc.), such as in discrete foil patches or in an array of foil patches connected by narrow traces and cut from a single foil sheet. The electrodes can be coated in a non-conductive material, such as polyethylene, and installed over a first layer (or first set of layers) of woven carbon fiber wrapped around a mandrel; a second layer (or second set of layers) of woven carbon fiber can then be wrapped around the electrodes and the first layer(s) of woven carbon fiber. In this example, an additional layer of electrodes can then be installed over the second layer(s) of woven carbon fiber, such as offset from electrodes in the layer below, and a third layer (or third set of layers)

of woven carbon fiber can then be wrapped around this second set of electrodes. Once epoxy embedded in the woven carbon fiber layers is cured and the mandrel removed, one lead from each discrete electrode or one lead from each array of electrodes can be connected to a controller, which can later implement self-capacitance or mutual-capacitance sensing techniques, respectively, to detect objects nearby and/or in contact with the arm segment. In another example, conductive wire, conductive wire mesh panels, or other conductive elements can be similarly embedded in the functional structure of an arm segment.

In another implementation, electrodes are applied to a surface of an arm segment. In one example, an arm segment, a composite, polymer, and/or metal tubular (e.g., thin-walled, cylindrical) structure defining an exterior surface are covered or coated in a non-conductive material (e.g., epoxy, polyester resin, etc.). In this example, a first layer of electrodes are screen-printed in a conductive ink over the exterior surface of the arm segment; solder pads or solder-free contact pads and leads connecting the pads to corresponding electrodes in the first layer of electrodes can be similarly printed over the exterior surface of the arm segment. The pads can then be masked and a layer of non-conductive material subsequently sprayed, rolled, or printed over the first layer of electrodes. For a mutual-capacitance sensing configuration, a second layer of electrodes, leads, and pads can be similarly screen-printed in a conductive ink over the layer of non-conductive material; pads in both the first and second layer of electrodes can then be masked and a second layer of non-conductive material applied over the arm segment to enclose the second layer of electrodes. Ground-plane electrodes and/or additional layers of (sense and/or control) electrodes can be similarly applied over the exterior surface of the arm segment.

In another example, a layer of conductive material (e.g., a 0.0005"-thick copper or tin layer) can be sputtered, blast-coated, hot-dipped, plated, or otherwise applied over the exterior surface of the arm segment. In this example, electrodes, traces, solder pads, and/or solder-free contact pads, etc. can be masked over the layer of conductive material, such as by a screen-printing process, and exposed regions of the conductive material then removed from the arm segment by etching (e.g., an acid wash), thereby forming a first layer of electrodes, traces, and pads on the exterior surface of the arm segment. As described above, a layer of non-conductive material can then be printed, deposited, wrapped or otherwise applied over this first layer of electrodes, and one or more additional layers of electrodes can be similarly formed over the first layer of non-conductive material.

Methods and techniques similar to those described in the foregoing implementations can also be implemented to apply one or more electrode layers to the interior surface of the arm segment in addition to or instead of electrode layers applied to the exterior surface of the arm segment. The controller 123 and a ribbon connector (or similar hookup wire connector) can then be installed on or in the arm segment, as described below.

In another implementation, one or more layers of electrodes are formed on a flexible printed circuit board (or "PCB"), such as on a polyether ether ketone (PEEK) or polymide film. In this implementation, the flexible PCB can be wrapped around and fastened to the exterior of the arm segment. For example, the flexible PCB can be adhered (e.g., glued) to the exterior surface of the arm segment. In another example, the flexible PCB is wrapped around the arm segment, the arm segment and flexible PCB are inserted into a tube of heat-shrink tubing, and the heat-shrink tubing is shrunk—by heating—around the arm segment to fasten the flexible PCB to the arm segment. In this implementation, the arm segment can include male registration features (e.g., embossed dimples, pins) on its exterior surface, and the flexible PCB can include female registration features (e.g., holes) that align with the male registration features to locate the flexible PCB on the arm segment.

In a similar implementation, one or more electrode layers are formed in a flexible PCB, and the flexible PCB is inserted (e.g., "stuffed") into the interior volume of the arm segment. In this implementation and the foregoing implementation, the controller 123 can be installed on the flexible PCB before the flexible PCB is installed in or around the arm segment. A ribbon connector (or similar hookup wire connector) can also be installed on the flexible PCB before the flexible PCB is installed in or around the arm segment, and a ribbon cable can be routed from the ribbon connector to the processor 150 in the base 110 during assembly of the system 100, such as shown in FIG. 3.

One variation of the system 100 includes an aesthetic cover (e.g., a two-part clamshell cover) that encases an arm segment. In this variation, the foregoing methods and techniques can be implemented to integrate or install electrodes, traces, pads, and/or a controller into or onto a surface of the aesthetic cover. The aesthetic cover can thus be installed on the arm segment (e.g., over a rigid beam extending between actuatable axes on each side of the arm segment); and a controller arranged within the aesthetic cover can read capacitance values of these electrodes and communicate these capacitance values to the processor 150, as described herein. Actuatable axes, an end effector, and/or the base 110, etc. can also include housings or covers with electrodes similarly embedded or applied and similarly connected to the processor 150 via shared or dedicated controllers and ribbon cables.

8. Controller

The controller 123 is configured to measure the capacitance value of a sense circuit during actuation of the robotic arm 102 and to return this capacitance value to the processor 150. Generally, the controller 123 functions to execute Block S120 (and Block S122) of the method to read a capacitance value of a sense circuit during a sampling period and to return this value to the processor 150 for analysis, as described below. For example, the controller 123 can measure a total charge/discharge time, a discharge time, a resonant frequency, and/or an RC or LC time constant for a driven electrode and an adjacent ground electrode in a mutual-capacitance system during a single sampling period.

The controller 123 can measure a capacitance value of a sense circuit at a regular (i.e., static) sampling rate, such as at a rate of 20 Hz. Alternatively, the controller 123 can measure a capacitance value of a sense circuit when the robotic arm 102 reaches a predefined waypoint along a preplanned trajectory. For example, the processor 150 can track the position of the end effector 140 in space during execution of a preplanned trajectory based on position values read from position sensors within each actuatable axis and trigger the controller 123 to measure a capacitance value of the sense circuit following each 1" change in absolute position of the end effector 140 along the preplanned trajectory. In this example, the controller 123 can measure a first capacitance (e.g., a first resonant frequency) of a first sense circuit—coupled to a first electrode extending over a first arm segment of the robotic arm 102—at a first time in which the robotic arm 102 occupies a first position along the trajectory in Block S120 and then measure a second capacitance (e.g., a second resonant frequency) of the first sense circuit 122 at a second time in which the robotic arm 102 occupies a second position along the trajectory in Block S122.

A controller can be integrated directly into an arm segment (or into an actuatable axis, into an end effector, into the base 110, etc.). In one implementation in which electrodes on or within an arm segment are electrically connected to a set of solder pads or solder-free contact pads, such as via a set of traces or leads, a controller (e.g., one or more integrated circuits, multiplexers, ribbon connectors, etc.) can be installed on (e.g., soldered onto) a rigid controller PCB including a set of traces terminating in a set of conductive areas in a pattern corresponding to the contact pads; conductive foam can be adhered over each conductive area, and the controller 123 PCB can be aligned over the contact pads and fastened (e.g., with a threaded fastener), adhered (e.g., with an epoxy or potting material), strapped, or otherwise coupled to the arm segment. In this implementation, because the contact pads may span a curved (i.e., non-planar) surface on the interior or exterior of the arm segment, the conductive foam pads can absorb gaps between and ensure reliable contact between conductive areas on the controller 123 PCB and the corresponding contact pads on the arm segment.

Alternatively, as described above, a controller can be integrated into a flexible PCB wrapped around or stuffed into an arm segment (or into an aesthetic cover installed on an arm segment). Yet alternatively, the arm segment can define a substantially planar region on its interior surface or on its exterior surface. In this implementation, each electrode or array of electrodes on the arm segment can be electrically connected to a contact pad within the planar region, and the controller 123 (e.g., one or more integrated circuits, multiplexers, ribbon connectors, etc.) can be installed directly onto corresponding contact pads, such as with low-temperature solder paste or with a conductive adhesive (e.g., a copper powder/epoxy adhesive). However, the controller 123 (or controller circuit) can be installed or connected to discrete electrodes or electrode arrays on a corresponding arm segment in any other suitable way.

8.1 Projected Mutual-Capacitance

In one variation in which an arm segment of the robotic arm 102 includes a set of ground electrodes (e.g., in rows) in a first layer and a set of sense electrodes (e.g., in columns) in a second layer isolated from the first layer by a dielectric layer, the controller 123 can selectively ground and drive select ground electrode channels and select sense electrode channels, respectively, to capture capacitance values or changes in capacitance values along the arm segment; the processor 150 can collect these capacitance data from the controller 123 substantially in real-time and can correlate these data with proximity of an object to the arm segment.

For example, within a sampling period, the controller 123 can: hold a first ground electrode channel in the array of ground electrode channels at ground; float the remaining ground electrode channels; test a first sense electrode channel in the array of sense electrode channels; test the remaining sense electrode channels in series; float the first ground electrode channel and ground a second ground electrode channel in the array of ground electrode channels; continue to float the remaining ground electrode channels; test the first sense electrode channel in the array of sense electrode channels; and test the remaining sense electrode channels in series; and repeat this process sequentially for the remaining ground electrode channels within the sampling period.

To test a sense electrode, the controller 123 can drive a single sense electrode channel during a sense period to load a particular sense electrode in the sense electrode channel with charge such that the particular sense electrode capacitively couples to a particular ground electrode—adjacent the particular sense electrode—that is simultaneously connected to ground during the sense period. The particular sense electrode and the particular ground electrode can thus define an "electrode pair" in which charge collects on the particular sense electrode and leaks into the particular ground electrode during the sense period and/or onto an external object nearby.

In one implementation, for each electrode pair tested within a sampling period, the controller 123 reads a charge and/or discharge time for an electrode pair and stores this charge and/or discharge time in a capacitance matrix for the sampling period. In this implementation, the capacitance matrix can correspond to the current sampling period, and each position (or "electrode address") within the capacitance matrix can correspond to a charge and/or discharge time read from a particular electrode pair on the arm segment, and the controller 123 can write the charge/discharge time for each electrode pair to the corresponding address in the capacitance matrix. The controller 123 can then transmit this capacitance matrix (and a timestamp for the current sampling period) to the processor 150, such as via serial communication (e.g., via I2C or via a two-wire communication protocol).

In a similar implementation, the controller 123: tests the resonant frequency of each electrode pair on the arm segment in series during a sampling period; records these resonant frequencies in corresponding addresses within a capacitance matrix for the current sampling period; and then transmits this capacitance matrix (in real-time) to the processor 150. The processor 150 can then transform these data into identification of a nearby object substantially in real-time, as described below.

Alternatively, the controller 123 can selectively couple and decouple each electrode pair on the arm segment to an input channel on the processor 150. For example, the controller 123: can include an analog sensor output channel connected to an analog sensor input channel on the processor 150 via a first hookup wire routed from the arm segment to the base 110; can include a control input channel connected to a control output channel on the processor 150 via a second hookup wire similarly routed between the arm segment and the base 110; and can couple electrode pairs on the arm segment to the analog input channel on the processor 150 according to an electrode pair test address received from the processor 150. The processor 150 can then record a charge/discharge time or a resonant frequency of an electrode pair corresponding to an electrode pair test address passed to the controller 123. For example, the processor 150 can record a charge time across an electrode pair or read a change in the resonant frequency of an electrode pair on an arm segment and compare these values to a static or dynamic capacitance model to detect proximity of an object to the arm segment, as described below.

In a similar implementation, the controller 123 includes a standard sigma-delta circuit or an equivalent-resistance sigma-delta circuit including an output connected to a digital input channel on the processor 150, such as via a first hookup wire. The sigma-delta circuit can also be connected to an output channel of a clock arranged in the base 110, such as a clock integrated into the processor 150 or arranged on a motherboard adjacent the processor 150, via a second hookup wire. In this implementation, for each electrode pair on the arm segment, the controller 123 can selectively couple and decouple an electrode pair between a regulated input voltage and ground in a standard sigma-delta circuit or between a regulated input voltage and the non-inverting input of an Op-amp in an equivalent-resistance sigma-delta circuit in series. For each electrode pair connected to the sigma-delta circuit, the sigma-delta circuit can output a density-modulated bit stream, and the processor 150 can calculate the duty cycle of the density-modulated bit stream for each electrode pair within a sampling period and then transform these duty cycle data into identification of a nearby object(s) within the sampling period, as described below. In this implementation, the controller 123 can cycle the ground electrode channels between ground and float states and cycle the sense electrode channels between driven and float states based on a clock signal from the clock and a static sampling procedure stored locally in the controller 123 or on a dynamic sampling procedure uploaded from the processor 150 to the controller 123 intermittently throughout operation of the system 100. Alternatively, the controller 123 can cycle the ground electrode channels between ground and float states and cycle the sense electrode channels between driven and float states based on electrode pair addresses received from the processor 150 (e.g., in real time) during operation.

8.2 Projected Self-Capacitance

In another variation in which electrodes on the arm segment are arranged in a single layer and are configured to capacitively couple to external objects proximal the arm segment, the controller 123 can implement self-capacitance sensing techniques to record capacitance values or changes in capacitance values across an arm segment of the robotic arm 102.

For example, in one sampling period, the controller 123 can connect one side of a first electrode on the arm segment to a current supply and connect a second side of the first electrode 121 to ground during a first sense period, ground or float leads to all other electrodes on the arm segment during the first sense period, and record a total current passing through the first electrode 121 during the first sense period. Within one sampling period, the controller 123 can then: connect one side of a second electrode on the arm segment to the current supply and connect a second side of the second electrode 131 to ground during a second (i.e., subsequent) sense period; ground or float leads to all other electrodes on the arm segment during the second sense period; and record a total current passing through the first electrode within the same sense period. The controller 123 can repeat this process for each electrode on the arm segment to test all (or a subset of) electrodes within the sampling period. The controller 123 can aggregate these data, such as into an addressed capacitance matrix of current values, and communicate these data to the processor 150, such as described above. The processor 150 can then compare current draw values at each electrode across consecutive (or a set of consecutive) sampling periods to detect current draw changes at select electrodes, and the processor 150 can correlate these current draw changes (e.g., increases in current draw) with proximity of an object to the corresponding electrodes.

Each arm segment can include a controller that implements self- or mutual-capacitance sensing techniques to test electrodes on the corresponding arm segment in each sampling period. Each controller can pass capacitance values to the processor 150, such as serially or in one timestamped capacitance matrix per sampling period, for analysis, as described below. Alternatively, the system 100 can include one controller electrically coupled to a set of electrodes on (or in) each of two or more arm segments, and the controller 123 can implement self- or mutual-capacitance sensing techniques to measure capacitance values or changes in capacitance values across the two or more arm segments within a single sampling period. However, the controller 123 can function in any other way to capture capacitance values across one or more arm segments and to feed these data to the processor 150.

9. Processor

The processor 150 functions to detect deviations (e.g., from a normal or known condition) in the operating volume based on capacitance values received from one or more controllers in the robotic arm 102, to issue proximity alarms when such deviations are detected, and to cease or modify actuation of the robotic arm 102 when proximity alarms are active. In one implementation, the processor 150 is arranged in the base 110, is connected to each controller housed in arm segments of the robotic arm 102 (e.g., via one or more ribbon cables), and receives and processes capacitance value data received from the controller 123s while the system 100 is in operation. For example, the system 100 can include one controller in each arm segment, in each actuatable axis, in the base 110, and/or in an end effector, etc., and the processor 150 can receive capacitance value data from each of these controllers during each sampling period or at each waypoint along a preplanned trajectory, process these data to detect an object approaching the robotic arm 102 (or an object that the robotic arm 102 is approaching), and to cease or modify a planned trajectory of each arm segment responsive to detection of a new (i.e., unknown) object near the robotic arm 102. As described above, the processor 150 can receive capacitance values from each controller, such as in the form of a total charge/discharge time, a discharge time, a resonant frequency, an RC or LC time constant, or a leakage current for each driven electrode, etc., and can apply static or dynamic threshold capacitance value models or parametric capacitance models to these capacitance data to determine whether a new object has entered the robotic arm's operating volume.

10. Absolute Distance

In one implementation, the processor 150 compares capacitance data received from the controller 123(s) to a static capacitance value model for the robotic arm 102. The capacitance value model can define threshold capacitance values for each sense and/or control electrode 170 in the robotic arm 102. For example, an arm segment can include multiple electrodes, each defining a different capacitive area, such as ranging from four square inches (e.g., sense electrodes) to 0.01 inches square (e.g., control electrodes), and tuned to detect proximity of an object at a particular distance therefrom, such as up to a distance of 12" for a sense electrode and to a distance of up to 0.25" for a control electrode 170, respectively. In this example, the capacitance value model can include a threshold capacitance value corresponding to presence of an object within a corresponding threshold distance for each electrode on the arm segment, and the processor 150 can compare capacitance values received from the controller 123 to the threshold capacitance values in the capacitance value model to determine if an object is within a threshold distance of a particular electrode on the arm segment.

The processor 150 can then estimate both a distance between the object and the arm segment and a position of the object in space relative to the arm segment during the sampling period based on: known positions of each electrode on the arm segment; which corresponding sense circuits exhibited capacitance values that exceeded corresponding threshold capacitance values; and which corresponding sense circuits exhibited capacitance values that did not exceed corresponding threshold capacitance values during the current sampling period. In this example, the processor 150 can update the threshold capacitance values over time, such as based on capacitance values read by a reference electrode integrated into the base 110 to compensate for humidity, temperature, and/or other environmental changes.

In another implementation, the processor 150 implements a set of parametric capacitance value models, including one distinct model per electrode, wherein each model is tuned to transform a capacitance value read from a corresponding electrode (i.e., from a corresponding sense circuit) into an estimated distance of an object from the electrode. For each sampling period, the processor 150 can apply capacitance values read from each electrode during a sampling period to corresponding capacitance value models to generate a capacitance matrix, capacitance model, or other container defining estimated distances between discrete surfaces on the robotic arm 102 and one or more objects in space as a function of capacitance. Similarly, the processor 150 can implement a single parametric capacitance value model that transforms a capacitance value, effective surface area, geometry factor, position, drive voltage, drive time, etc. of a particular electrode into an estimated distance between an object and the particular electrode on the robotic arm 102. In this example, the processor 150 can retrieve static electrode-specific values, such as electrode position and effective surface area, from a lookup table or other database in local (or remote) memory and can insert these data into the parametric capacitance value model to estimate a proximity of an object to a particular electrode.

The processor 150 can also implement auto-correct techniques to adjust the parametric capacitance value model(s) over time, such as to compensate for sensor drift and environment changes. For example, the processor 150 can sample one or more environmental sensors integrated into the system 100 to collect current humidity, temperature, and/or other quantitative environmental data for a sampling period and can then insert these data directly into the parametric capacitance value model when calculating object proximities across the robotic arm 102 for the sampling period. The processor 150 can additionally or alternatively transmit a command to one or more controllers to modify a reference signal driving a reference electrode on a corresponding arm segment based on an observed environment change.

For each sampling period, the processor 150 can also modify the parametric capacitance value model(s) based on the geometry of the robotic arm 102 (i.e., the angular position of each actuatable axis) during the sampling period. For example, the processor 150 can sample an encoder at each actuatable axis within the system 100 and can transform angular position data received from each encoder into a position capacitance matrix defining a position of each electrode in space. In this example, the processor 150 can transform the position capacitance matrix into a capacitive coupling capacitance matrix containing capacitive coupling factors corresponding to estimated changes in capacitance values for each electrode on the robotic arm 102 due to capacitive coupling with other (sense or control) electrodes on the robotic arm 102, which may be a function of the geometry of the robotic arm 102 when the electrodes are tested during the sampling period. The processor 150 can then insert the capacitive coupling capacitance matrix or discrete capacitive coupling factors into the parametric capacitance model(s) to compensate for the effect of the geometry of the robotic arm 102—which changes as the system 100 executes a trajectory—on capacitance values collected from the electrodes. In the implementation described above in which the processor 150 compares capacitance values received from a controller to a capacitance value model for the robotic arm 102, the processor 150 can similarly modify capacitance value thresholds in the capacitance value model for a sampling period based on the geometry of the robotic arm 102 during the sampling period.

11. Relative Presence

In another variation, the processor 150: calculates a rate of change in capacitance of a sense circuit between a first time in which the robotic arm 102 occupies a first position in space and a second time in which the robotic arm 102 occupies a second position in space in Block S130; and issues a proximity alarm—substantially in real-time—if the rate of change in capacitance of the sense circuit exceeds a threshold rate of change in Block S140, as shown in FIG. 4. Generally, in this variation, the processor 150 calculates a rate of change in capacitance (e.g., resonant frequency) between two positions occupied by the robotic arm 102 over the course of a preplanned trajectory and identifies a possible change in the operating volume of the robotic arm 102 if this actual rate of change in capacitance differs from a baseline rate of change in capacitance for the same segment of the preplanned trajectory. For example, a sense circuit may exhibit both large amounts of noise and variations in absolute capacitance value (i.e., "drift") such that an absolute capacitance value read from the sense circuit is—independent of additional data—unrepresentative of absolute distance between an electrode in the sense circuit and an external object. However, a derivative of absolute capacitance values read from the sense circuit—that is, a rate of change in capacitance value—may exhibit significantly less noise and significantly less drift than a singular absolute capacitance value. The processor 150 can therefore calculate an actual rate of change in capacitance value of the sense circuit between two positions along a preplanned trajectory, issue a proximity alarm if a deviation in this actual rate of change in capacitance value deviates from a baseline (or exceeds a threshold) rate of change in capacitance value, and repeat this process as the robotic arm 102 moves through successive positions along the preplanned trajectory.

11.1 Capacitance Value Rate of Change

As shown in FIG. 4, the processor 150 can therefore execute Block S130, which recites calculating a rate of change in capacitance of the sense circuit based on a difference between a capacitance of the sense circuit measured at a first position of the robotic arm 102 and a second capacitance of the sense circuit measured at a second position of the robotic arm 102. Generally, in Block S130, the processor 150 can receive a sequence of capacitance values of the sense circuit from the controller 123, such as in the form of a feed of discrete capacitance values or in the form of timestamped capacitance matrices, as described above. The processor 150 can then subtract a last capacitance value of the sense circuit from a latest capacitance value of the sensor circuit and divide this sum by a time difference between measurement of the last capacitance value and the latest capacitance value to calculate the rate of change in capacitance of the sense circuit in Block S130 and compare this actual rate of change to a baseline (or threshold) rate of change for the same two positions along the preplanned trajectory. The processor 150 can also calculate a running average rate of change in capacitance value over a sequence of sampling periods in Block S130 and compare this actual average rate of change to an average baseline (or threshold) rate of change for the sequence of positions along the preplanned trajectory in Block S140. For example, the processor 150 can calculate rates of change in capacitance value of the sense electrode for adjacent pairs of sampling positions of the robotic arm 102 over a contiguous sequence of five total sampling positions or over a contiguous sequence of sampling positions spanning two inches of displacement of the end effector 140 along the preplanned trajectory. In this example, this processor can average these rates of change in capacitance value, such as by applying a greatest weight to a most recent rate of change, before comparing this actual average rate of change to an average baseline (or threshold) rate of change for the same or similar sequence of sampling positions along the preplanned trajectory in Block S140.

However, the processor 150 can implement any other method or technique to calculate a rate of change in capacitance of the sense circuit in Block S130. The processor 150 can execute this process to calculate a rate of change in capacitance of each other sense circuit incorporated into one or more arm segments of the robotic arm 102; and the processor 150 can store these rate of change values in a rate of change array or rate of change matrix for subsequent processing in Block S140.

11.2 Baseline Capacitance Map

Figure 7:
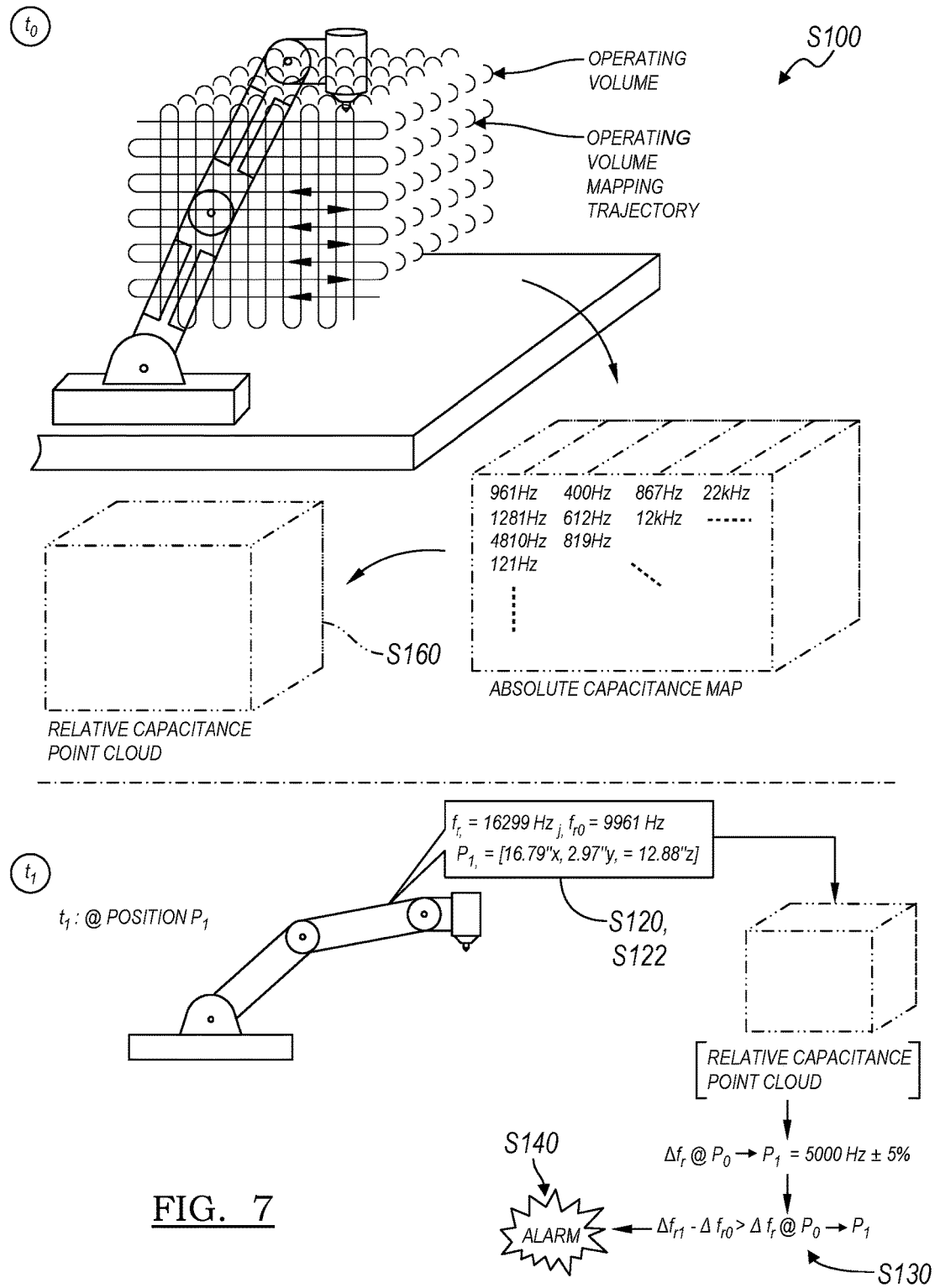
FIG. 7 is a flowchart representation of one variation of the method.

As shown in FIG. 7, one variation of the method includes Block S160, which recites executing a capacitance mapping routine to generate a baseline capacitance map of a physical space occupied by the robotic arm 102. In this variation, the controller 123 and processor can cooperate to generate a capacitance map of the robotic arm's operating volume: loading a capacitance mapping routine defining a mapping trajectory; moving the robotic arm 102 through the mapping trajectory; recording a set of absolute capacitance values of the sense circuit at discrete waypoints along the capacitance mapping route; transforming the set of absolute capacitance values into relative capacitance value changes between the discrete waypoints along the capacitance mapping route; aggregating the relative capacitance value changes into a baseline capacitance map of a physical space occupied by the robotic arm 102; and calculating the threshold rate of change between the first position and the second position from the baseline capacitance map and a speed of the robotic arm 102 between the first position and the second position. In particular, the processor 150 can execute a capacitance mapping routine prior to autonomous operation, such as during setup and under supervision of an operator, by navigating the robotic arm 102 through a set of waypoints defined within a capacitance mapping routine and then generating a capacitance map of the operating volume based on capacitance data collected at these waypoints.

In one implementation, the processor 150 generates a capacitance map of the operating volume from data collected over a set of repeated instances of a preplanned trajectory (or "canned cycles") over time. In this implementation, the processor 150 can implement closed-loop controls to navigate the robotic arm 102 through a final preplanned trajectory; the controller 123 can measure capacitance values of the sense circuit(s) at each of a set of discrete waypoints along the preplanned trajectory; and the processor 150 then compiles these capacitance values into a capacitance map of the operating volume. In one example, once loaded with a preplanned trajectory for autonomous execution by the system 100, the processor 150 executes a first instance of the trajectory at a slow speed (e.g., 5% of a maximum speed of each actuatable axis in the robotic arm 102 or 5% of a speed specified in the trajectory) and compiles capacitance data received from the controller 123 into a capacitance map of the operating volume until the first instance of trajectory is completed or until an impact with an external object is detected (e.g., via a signal output by an accelerometer, load cell, or force sensor arranged within an actuatable axis). In this example, the controller 123 can sample the sense circuit(s) at a rate of 20 Hz, 1 Hz, or at any other static sampling rate. Alternatively, the controller 123 can sample the sense circuit(s) at select waypoints along the trajectory, such as for each one-degree (1°) change in the position of an actuatable axis or for each one-inch (1") change in the absolute position of the end effector 140 in space. The processor 150 can then calculate the difference in capacitance values between each pair of consecutive sampling periods or waypoints along the trajectory and pair each capacitance difference with a corresponding position of the robotic arm 102, such as in the form of an angular position of each actuatable axis at the later of the pair of sampling periods or waypoints. If no impact between the robotic arm 102 and an external object is detected upon completion of the trajectory, the processor 150 can store these capacitance difference and robotic arm 102 position pairs in a baseline capacitance map specific to the preplanned trajectory.

In the foregoing example, the processor 150 can then repeat the trajectory at a greater speed, such as 20% of maximum speed of each actuatable axis or 20% of the speed specified in trajectory. During execution of this second instance of the trajectory, the processor 150 can: navigate the robotic arm 102 to a first position (i.e., a first "waypoint") along the trajectory; record capacitance values (e.g., resonant frequencies) of the sense circuit(s) and read encoders in the actuatable axes at the first position; move the robotic arm 102 to a second position (i.e., a second "waypoint") along the trajectory; record capacitance values of the sense circuit(s) and read encoders in actuatable axes at the second position; and calculate an actual rate of change in capacitance of the sense circuit from the first position to the second position along a trajectory and a duration of time occurring between realization of the first and second positions. The processor 150 can also calculate a baseline rate of change in capacitance from the first position to the second position from capacitance differences stored in the baseline capacitance map and the duration of time between realization of the first position and the second position. The processor 150 can then compare the actual rate of change in capacitance from the first position to the second position to the baseline rate of change; and continue execution of the trajectory if the actual and baseline rates of change are substantially similar, such as within a 5% threshold difference. In particular, the processor 150 can navigate the robotic arm 102 to a third position (i.e., a third "waypoint") along the trajectory, repeat the foregoing process for the third position, move the robotic arm 102 to a fourth position if a difference between actual and baseline rates of change between the second and third positions are substantially similar, etc. until the trajectory is completed or until a crash is detected.

The processor 150 can create a new baseline capacitance map from data collected during this second instance of the trajectory or update the existing baseline capacitance map with these data. The processor 150 can continue to repeat this process with the trajectory executed at increasingly greater speeds—up to 100% of the maximum speed of the arm or up to 100% of a speed specified for the trajectory—to refine the baseline capacitance map for the trajectory. The processor 150 can thus test a trajectory and construct a baseline capacitance map for the trajectory—without human supervision—by executing the trajectory at increasingly greater speeds and leveraging a baseline capacitance map generated in a previous, slower instance of the trajectory to predict changes in the robotic arm's operating volume at increasingly faster instances of the trajectory. (The processor 150 can also implement the foregoing methods and techniques to update or refine the baseline capacitance map during later full-speed runs of the preplanned trajectory.)

In another example, the processor 150 can generate a single baseline capacitance map during supervised execution of the trajectory. For example, when provided manual confirmation from an operator that the robotic arm's operating volume is clear, the system 100 can execute the trajectory at full speed, and the processor 150 can assemble capacitance values received from the controller 123 into one baseline capacitance map.

In another implementation shown in FIG. 7, the processor 150 generates a trajectory-agnostic capacitance map of the operating volume of the robotic arm 102 from capacitance values of the sense circuit(s) collected during a unique capacitance mapping routine. For example, the processor 150 can navigate the robotic arm 102 (or the end effector 140, specifically) to discrete positions within the three-dimensional operating volume reachable by the end effector 140 and record capacitance values of the sense circuit(s) at each discrete position. In this example, the process can access a list of baseline waypoints representing a three-dimensional grid array of three-dimensionally offset positions within the operating volume, sequentially step the robotic arm 102 through each baseline waypoint in this list, and record an absolute capacitance value of the sense circuit at each baseline waypoint. The processor 150 can then implement methods and techniques described above to calculate a difference between capacitance values recorded at each pair of adjacent baseline waypoints and then populate a virtual three-dimensional point cloud with the capacitance difference values and a position of the robotic arm 102 (or the end effector 140) at the corresponding baseline waypoint.

However, the processor 150 can implement any other methods or techniques to generate a baseline capacitance map—containing absolute capacitance values, relative capacitance values, or rates of change in capacitance value—of the space occupied by the robotic arm 102. For example, the processor 150 can execute any of the foregoing methods and techniques to generate a baseline capacitance map when the robotic arm 102 is first placed in a new environment, when the robotic arm 102 is repositioned within an environment, or when a new preplanned trajectory is loaded into the system 100.

11.3 Threshold Rate of Change and Rate of Change Window

The processor 150 can then extract a threshold rate of change and/or a rate of change window from the baseline capacitance map for comparison to capacitance values read from the sense circuit during execution of a subsequent preplanned trajectory in Block S140.

In the implementation described above in which the processor 150 generates a trajectory-agnostic baseline capacitance map, such as in the form of a three-dimensional point cloud, the processor 150 can asynchronously interpolate a rate of change window between each pair of adjacent waypoints along a new trajectory when the new trajectory is loaded into the system 100 and before the new trajectory is first executed by the system 100. For example, the processor 150 can access a predefined list of waypoints or calculate a set of waypoints, such as for each 0.1" or 1" change in the position of the end effector 140 in space. The processor 150 can then interpolate a target relative change in capacitance of the sense circuit for each pair of adjacent waypoints along the trajectory by compiling (e.g., averaging, weighting) capacitance values—for one or more nearest baseline waypoints—stored in the baseline capacitance map. In this example, the processor 150 can then: estimate a duration of time spanning realization of two waypoints by the robotic arm 102 based on speed of the robotic arm 102—between these two points—specified in the trajectory; calculate a target rate of change in capacitance between these two waypoints along the trajectory by dividing the target relative change in capacitance between these two waypoints by the estimated duration of time spanning their realization by the robotic arm 102; and calculate a threshold rate of change in capacitance between these two waypoints from the target rate of change in capacitance, such as by setting the threshold rate of change at 105% of the target rate of change. During subsequent execution of the trajectory, the processor 150 can calculate an actual rate of change in capacitance between these two waypoints along the trajectory, as described above, and issue a proximity alarm in Block S140 if this actual rate of change exceeds the threshold rate of change.

Alternatively, the processor 150 can define a rate of change window—spanning rates of change in capacitance not indicative of a change in the robotic arm's operating volume—between these two waypoints. For example, the processor 150 can define a rate of change window spanning +/−5% of the target rate of change for the two waypoints; during subsequent realization of the two waypoints along the preplanned trajectory, the system 100 can calculate an actual rate of change in capacitance between these two waypoints and issue a proximity alarm if the actual rate of change falls outside of the rate of change window.

The process can implement similar methods and techniques for each other waypoint along the trajectory in order to generate a set of threshold rates of change (or a set of rate of change windows) for each waypoint. The processor 150 can then reference this set of threshold rates of change (or rate of change windows) throughout subsequent execution of the trajectory to determine if the robotic arm's operating volume has changed, such as whether an unknown object has entered the three-dimensional volume reachable by the end effector 140.

Alternatively, the processor 150 can implement the foregoing methods and techniques in real-time to calculate threshold rates of change or rate of change windows as the robotic arm 102 advances through the sequence of waypoints within the preplanned trajectory, such as based on measured (e.g., "actual") times spanning realization of adjacent waypoint pairs along the trajectory.

Furthermore, for the robotic arm 102 that includes multiple sense electrodes and sensor circuits on one arm segment and/or electrodes and sense circuits on multiple arm segments, the processor 150 can implement the foregoing methods and techniques to generate a baseline capacitance map containing absolute capacitance values, relative capacitance values, capacitance value differences, and/or rates of change in capacitance value for each sense circuit. The processor 150 can also: transform these data into threshold rates of change (or rate of change windows) for each sense circuit between waypoints along a preplanned trajectory; and compare actual rates of change in capacitance of each sense circuit between two positions along the trajectory with corresponding threshold rates of change (or rate of change windows) in Block S140. In particular, the processor 150 can identify specific arm segments or regions of the robotic arm 102 nearing an unknown object in the operating volume based on a known position of an electrode—on the robotic arm 102—exhibiting a greatest deviation in rate of change in capacitance from a target rate of change (or threshold rate of change, rate of change window) defined in the baseline capacitance map between two corresponding waypoints along the trajectory, as described below.

11.4 Detecting Proximity to New Static and Moving Objects

During execution of a preplanned trajectory, the processor 150 can detect a change in the operating volume of the robotic arm 102—such as in the form of a new static or moving object in the vicinity of the robotic arm 102—based on deviations in the rate of change in capacitance of a sense circuit compared to a target or baseline rate of change. For example, the processor 150 can determine that an arm segment is approaching—relatively—a new object within the operating volume if the rate of change in capacitance of a sense circuit connected to an electrode on the arm segment exceeds a threshold rate of change.

Figure 6:
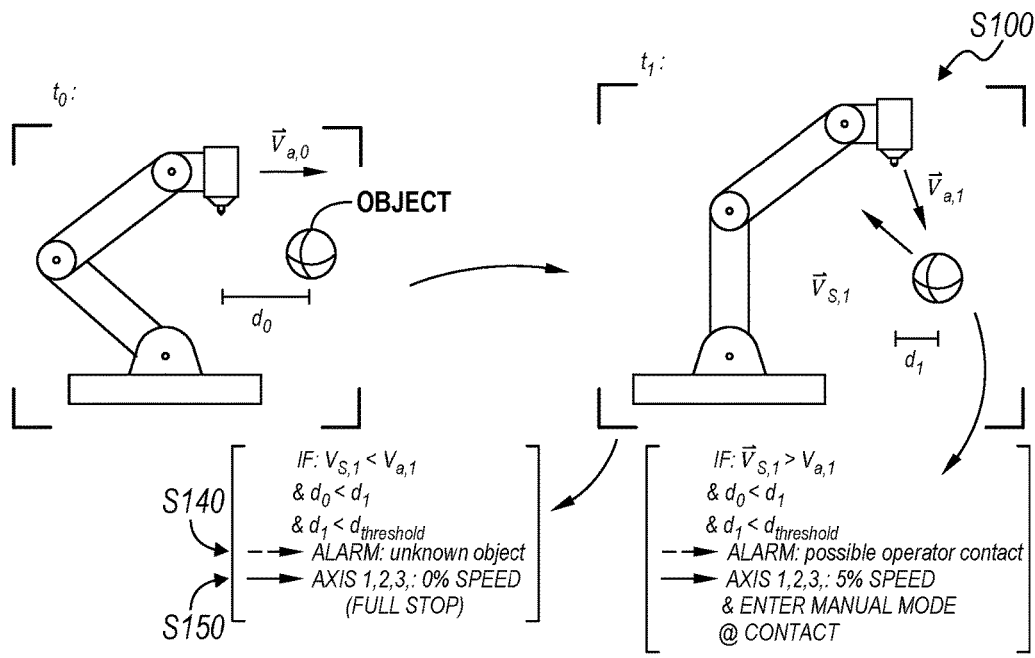
FIG. 6 is a flowchart representation of one variation of the method.

In one implementation, if the actual rate of change in capacitance of a sense circuit exceeds a corresponding threshold rate of change between a last waypoint and a current waypoint (or sampling period), the processor 150 can transform a difference between the actual and threshold (or corresponding baseline) rates of change into a difference between the actual speed of the corresponding electrode to a nearby surface and a target or expected speed of the electrode. The processor 150 can then sum this speed difference and the original target of expected speed to estimate a relative approach speed of the electrode to a new object in the operating volume between the last and current waypoints or sampling periods. The processor 150 can also transform a known position of the electrode (e.g., the centroid of the electrode) on an arm segment and rates of change in the positions of each actuatable axis between the last and current waypoints or sampling periods into an absolute speed of the electrode. The processor 150 can then compare the absolute speed of the electrode to the relative approach speed of the electrode to a new object to determine if the new object is static or moving relative to the electrode, as shown in FIG. 6. In particular, if the absolute speed of the electrode and the relative approach speed of the electrode are substantially similar (e.g., differ by no more than 10%), the processor 150 can determine that the new object is static, set a proximity alarm for an unknown static object in Block S140, and adjust motion of the robotic arm 102 accordingly, such as by reducing the speed of the robotic arm 102 by 50% in Block S150. However, if the relative approach speed of the electrode substantially exceeds the absolute speed of the electrode, such as by more than 10%, the processor 150 can determine that the new object is moving toward the electrode, set a proximity alarm for an unknown object moving toward the robotic arm 102, and stop motion of the robotic arm 102 altogether. Similarly, if the absolute speed of the electrode substantially exceeds the relative approach speed of the electrode, the processor 150 can determine that the new object is moving away from the electrode, set a proximity alarm for an unknown object moving away from the robotic arm 102, and slow motion of the robotic arm 102, such as by 10%.

Therefore, the processor 150 can: transform a rate of change in capacitance of a sense circuit into a speed of the corresponding electrode relative to an external object and issue a proximity alarm for motion toward a static object in Block S140 in response to the speed of the first electrode 121 relative to an external object approximating a speed of the robotic arm 102 from the first position to the second position; and then reduce the current speed of the robotic arm 102 to a fraction of the maximum of the robotic arm 102 while the proximity alarm for motion toward a static object is current in Block S150. For example, the processor 150 can implement the foregoing methods and techniques to detect recent placement of a notepad, pencil, or other object within the robotic arm's operating volume and slow motion of the robotic arm 102 accordingly until the offending object is removed from the operating volume. Similarly, the processor 150 can issue a proximity alarm for motion of a dynamic object toward the robotic arm 102 in Block S140 in response to the speed of the first electrode 121 relative to an external object exceeding a speed of the robotic arm 102 from the first position to the second position; and cease motion of the robotic arm 102 while the proximity alarm for motion of a dynamic object toward the robotic arm 102 is current in Block S150. For example, the processor 150 can implement the foregoing methods and techniques to detect movement of an operator's hand toward the robotic arm 102 and to stop motion of the robotic arm 102 entirely until the operator's hand is removed from the operating volume. The processor 150 can then execute methods and techniques described below to unlock actuatable axes in the robotic arm 102 if the operator grasps a region of the robotic arm 102, thereby enabling the operator to manually move the robotic arm 102.

The processor 150 can execute the foregoing methods and techniques to detect and confirm proximity of an unknown static or dynamic object within the operating volume in Block S140 and can preserve and/or tighten reduced speed limits on motion of the robotic arm 102 until such unknown static or dynamic object is no longer detected within the operating volume. For example, when a static object within the operating volume is first detected, the processor 150 reduces the total speed of the robotic arm 102 by 20%; if the static object is again detected after the electrode through which the static object was detected moved toward the general location of the static object by two inches (2"), the processor 150 can reduce the total speed of the robotic arm 102 by a further 20%. However, if the electrode is determined to have moved away from the static object, the processor 150 can return to full-speed actuation of the robotic arm 102.

11.5 Multiple Sense Circuits

As described above, the robotic arm 102 can include multiple arm segments, and each arm segment can include one or more electrodes and sense circuits. In this variation, the processor 150 can issue a position proximity alarm based on known positions of electrodes coupled to sense circuits exhibiting deviant capacitance values (e.g., actual resonant frequencies exceeding threshold resonant frequencies).

In one example, the robotic arm 102 includes: a first arm segment coupled to the base 110 (or to a second arm segment extending from the base 110) via a first actuatable axis; and a first electrode arranged across a dorsal side of the first arm segment 120 and coupled to a first sense circuit. In Block S140, the processor 150 can issue a proximity alarm for motion in a first direction normal to the dorsal side of the first arm segment 120 in response to a rate of change in capacitance of the first sense circuit exceeding a threshold rate of change. In Block S150, the processor 150 can selectively reduce the maximum actuation speed of the first actuatable axis 124 in a direction that moves the first arm segment 120 in the first direction while the proximity alarm is current. Specifically, in Block S150, the processor 150 can reduce a maximum speed of the first actuation axis in a direction that moves the first arm segment 120 toward the unknown object, such as by reducing the maximum speed of the first actuation axis in the first direction (or in both directions) by 50% or ceasing motion of the first actuation axis altogether.

In the foregoing example, the robotic arm 102 can also include: a second electrode arranged across a lateral (e.g., left-lateral) side of the first arm segment 120 and coupled to a second sense circuit. In Block S140, the processor 150 can also: selectively issue a second proximity alarm for motion in a second direction normal to the lateral side of the first arm segment 120 in response to a rate of change in capacitance of the second sense circuit 132 exceeding the threshold rate of change; and set a reduced maximum actuation speed of the second actuatable axis 134 in a direction that moves the first arm segment 120 in the second lateral direction when the second proximity alarm is current.

The robotic arm 102 can include additional arm segments including addition directional electrodes coupled to corresponding sense circuits, and the processor 150 can implement similar methods and techniques to issue directional proximity alarms and to set reduced actuation speeds for select actuation axes based on capacitance values of these sense circuits.

11.6 Detecting Distance to a New Object

In one variation, the robotic arm 102 includes multiple electrodes patterned across an arm segment and coupled to sense circuits exhibiting different sensible ranges—that is, a range of distances between an electrode and an external object over which relative motion of the external object yields detectable changes to a rate of change in capacitance of the sense circuit above a noise floor. In this variation, the processor 150 can implement the foregoing methods and techniques to detect deviations from expected or target rates of change in capacitance of each electrode and fuse these deviations with the known (or approximate) sensible range of each sense circuit to estimate a distance between an external object and the arm segment.

For example, the system 100 can include: a first electrode defining a first area (e.g., ten square inches, or 10 in$^2$), arranged on a first arm segment of the robotic arm 102, and coupled to a first sense circuit exhibiting a first sensible range (e.g., up to twenty inches, or 20", for a four-ounce steel sphere); and a second electrode defining a second area less than the first area (e.g., two square inches, or 2 in$^2$), arranged on the first arm segment 120 adjacent the first electrode 121, and coupled to a second sense circuit exhibiting a second sensible range (e.g., up to eight inches, or 8", for the four-ounce steel sphere) less than the first sensible range. In this example, the processor 150 can estimate that an unknown object is within a first proximity range (e.g., between eight inches and twenty inches, or between 8" and 20") of the first segment of the robotic arm 102 if a first rate of change in capacitance of the first sense circuit exceeds a corresponding threshold rate of change while a second rate of change in capacitance of the second sense circuit remains at or near an expected rate of change (e.g., remains less than a corresponding threshold rate of change). The processor 150 can issue a first proximity alarm for proximity of the unknown object within this first proximity range of the robotic arm 102 in Block S140 and reduce the current speed of the robotic arm to a first fraction (e.g., 50%) of the maximum speed of the robotic arm 102 while the first proximity alarm is current in Block S150.

However, the processor 150 can estimate that the unknown object is within a second proximity range less than the first proximity range (e.g., within eight inches, or within 8") of the first segment of the robotic arm 102 if both the first rate of change in capacitance of the first sense circuit exceeds a corresponding threshold rate of change if a second rate of change in capacitance of the second sense circuit exceeds a corresponding threshold rate of change. The processor 150 can issue a second proximity alarm for proximity of the unknown object within this second proximity range of the robotic arm 102 in Block S140 and reduce the current speed of the robotic to a second fraction—less than the first fraction—(e.g., 20% or 0%) of the maximum speed of the robotic arm 102 while the second proximity alarm is current.

The processor 150 can thus compare deviations in rate of change in capacitance of various electrodes characterized by different sensible ranges (for a common external object), to estimate a distance between an arm segment of the robotic arm 102 and an unknown external object.

However, the processor 150 can manipulate capacitance value data—received from one or more controllers during a sampling period or when the robotic arm 102 reaches a predefined waypoint—in any other way to detect the presence of an unknown object within the robotic arm's operating volume, to determine a position of the unknown object relative to the robotic arm 102, and/or to determine a region of the robotic arm 102 in contact with an object. The processor 150 can then issue a proximity alarm in Block S140 if an unknown object is detected. The processor 150 can repeat this process over time, such as for each sampling period or waypoint during execution of a trajectory, in order to issue, respond to, and clear proximity alarms in real-time.

The processor 150 can also store object presence, position, and/or distance data—generated capacitance data collected during a current sampling period or at a current waypoint—in a proximity matrix for the current sampling period or waypoint. The processor 150 can compare this current proximity matrix to a previous set of similar proximity matrices to track proximity, position, and/or distance of an unknown object relative to the robotic arm 102 over time. For example, for one sampling period or waypoint, the processor 150 can generate a proximity matrix (or proximity array or other container) addressing positions of electrodes coupled to sense circuits exhibiting actual capacitance values deviating from target or expected capacitance values (i.e., local positions of current proximity alarms); the processor 150 can then handle each directional proximity alarm separately in Block S150 to avoid one or more unknown objects within the operating volume, such as described below.

10. Object Avoidance

The processor 150 can also execute Block S150, which recites reducing a current speed of the robotic arm 102 moving through the trajectory in response to the proximity alarm. Generally, the processor 150 can set maximum articulation speed limits for one or more actuatable axes in the robotic arm 102 when an unknown object is detected within the robotic arm's operating volume.

In one example, if the processor 150 determines from a sequence of object position matrices generated over a series of sampling periods that an object is near the left side of the robotic arm 102 and is substantially static in space, the processor 150 can: issue a left side proximity alarm in Block S140; and set speed limits for actuatable axes at the posterior ends of the first and second arm segments at 50% of their maximum speeds but set a speed limit for a rotary axis in the base 110 at 50% of its maximum speed in the clockwise position and 10% of its maximum speed in the counter-clockwise position while the object remains in approximately the same absolute position such that the robotic arm 102 can extend, retract, and move away from the object relatively quickly but can move toward the object only at a much slower speed.

Figure 5:
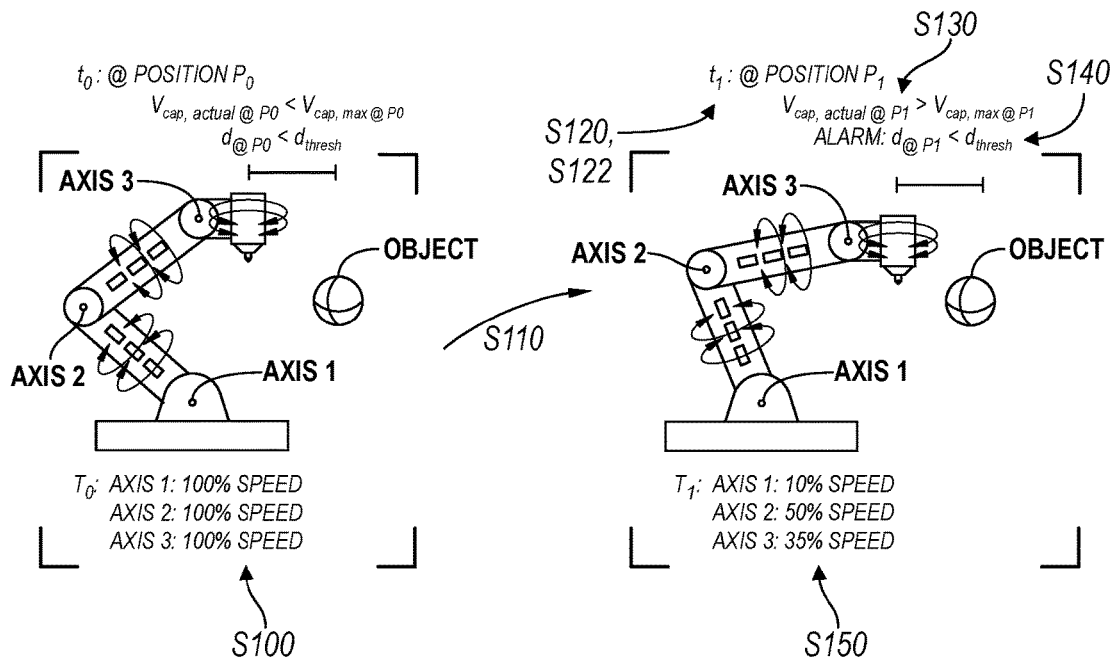
FIG. 5 is a flowchart representation of one variation of the method.

Similarly, if the processor 150 determines from a sequence of object position matrices generated over a series of sampling periods that an object is in front of the robotic arm 102 near the end effector 140 and is substantially static in space, the processor 150 can set speed limits for actuatable axes between arm segments at 50% of their maximum speeds for motions that retract the robotic arm 102 away from the object and at 10% of their maximum speeds for motions that extend the robotic arm 102 toward the object such that the robotic arm 102 can retract from the object relatively quickly but can move toward the object only at a much slower speed. In this example, the processor 150 can continue to reduce the speed limits of select actuatable axes in the robotic arm 102 as the robotic arm 102 moves closer to the object, as shown in FIG. 5, such as up to a full-stop speed when the installed end effector is within 1" of the object. The processor 150 can also increase speed limits on the actuatable axes as the robotic arm 102 moves away from the object. The processor 150 can therefore dynamically adjust speed limits on select actuatable axes within the robotic arm 102 based on both a distance between the robotic arm 102 and an external object and a position of an object relative to the robotic arm 102.

The processor 150 can also set a maximum articulation speed of each actuatable axes in the robotic arm 102 based on whether the robotic arm 102 is moving toward the object or whether the object is moving toward the robotic arm 102, as shown in FIG. 6. For example, the processor 150 can compare proximity matrices generated during the current and the last sampling periods to determine if a distance between a detected object and a particular electrode (or set of electrodes) of known position on the robotic arm 102 is increasing or decreasing; that is, the processor 150 can determine an approximate velocity of the object relative to one or more electrodes on the robotic arm 102 for the current sampling period based on proximity matrices generated over the current and the last sampling periods and a duration between the current and the last sampling period (i.e., the sampling rate). The processor 150 can also generate an arm position capacitance matrix defining a position of each electrode (or other point on the robotic arm 102) in space—such as a Jacobean capacitance matrix—for each sampling period. The processor 150 can then calculate a velocity of each electrode (or of various other points) on the robotic arm 102—such as relative to a reference point on the base 110—for the current sampling period based on differences between arm position matrices for the current and the last sampling period and the sampling rate. Thus, in one sampling period, if the velocity of the object relative to an electrode on the robotic arm 102 is negative, then the distance between the object and the electrode is decreasing; if the distance between the object and the electrode is decreasing and the velocity of the object relative to the electrode is greater than the velocity of the electrode relative to the reference point, the object is approaching the electrode; and, if the distance between the object and the electrode is decreasing and the velocity of the object relative to the electrode is less than the velocity of the electrode relative to the reference point, the electrode is approaching the object. The processor 150 can generate these calculations for all or select electrodes for each sampling period during operation of the system 100.

In the foregoing implementation, if the distance between the robotic arm 102 (e.g., a particular electrode) and the object is decreasing and the robotic arm 102 is approaching the object, the processor 150 can set speed limits for actuatable axes in the robotic arm 102 inversely with the distance between the robotic arm 102 and the object—as described above—and ceasing all motion toward the object once the detected distance between the object and any point on the robotic arm 102 reaches a threshold minimum distance (e.g., 1"). The processor 150 can continue to monitor outputs of the controller 123s in subsequent sampling periods and release the robotic arm 102 for further motion toward the object if the object moves away from the robotic arm 102. Thus, the processor 150 can slow the robotic arm 102 to a stop before contact and can recommence the trajectory once the object is no longer in the path of the robotic arm 102.

Alternatively, if the processor 150 determines that the distance between the arm and the object is decreasing and the object is approaching the robotic arm 102, the processor 150 can reduce the speed limits for actuatable axes in the robotic arm 102 as the distance between the robotic arm 102 and the object decreases, as described above, such as down to a speed limit of 2% of the maximum speed for any axis driving the robotic arm 102 toward the object, as shown in FIG. 6. The processor 150 can continue to drive the robotic arm 102—though relatively slowly—into the object according to the trajectory up to the point that the object contacts a surface of the robotic arm 102. When the processor 150 detects that the object (e.g., a hand) has contacted the robotic arm 102—such as based on capacitance data received from one or more controllers in the robotic arm 102 or based on an impact detected based on an output of an accelerometer or force sensor arranged in an actuatable axis—the processor 150 can transition from a trajectory execution mode to a manual manipulation mode or into a training mode. In the manual manipulation mode or training mode, the processor 150 can drive the actuatable axes in the robotic arm 102 according to inputs detected on the robotic arm 102, as described below. In particular, in the manual manipulation or training mode, the processor 150 can hold the robotic arm 102 in a current position until manipulated by an object (e.g., a user's hand or finger) in contact with a surface of the robotic arm 102, and the processor 150 can record motions at each actuatable axis as the robotic arm 102 is manipulated by the user. Once the object is released from the robotic arm 102, the processor 150 can return to execution of the trajectory, such as automatically or in response to confirmation from a user via a surface on the robotic arm 102 or through a user interface in communication with the system 100.

The processor 150 can implement the foregoing methods and techniques to set speed limits for motion of select actuatable axes, for select arm segments, and/or for an installed end effector. For example, to avoid an unknown object detected within the operating volume when executing a preplanned trajectory, the processor 150 can drive a second actuatable axis—between a first arm segment and a second arm segment—away from the detected object, thereby moving the second actuatable axis 134 off of its target path defined in the trajectory; simultaneously, the processor 150 can drive other actuatable axes within the robotic arm 102 to similarly deviant positions such that the end effector 140 remains on its target path defined by the trajectory.

The processor 150 can also set a sampling rate for the controller 123(s) within the arm based on the speed of the robotic arm 102 (or a real speed of each arm segment calculated from a real speed of each actuatable axis). For example, the processor 150 can increase the sampling rate— and update capacitance value thresholds for each sense circuit—as the velocity of the entire arm or of select actuatable axes increases; and vice versa. However, the processor 150 can collect and manipulate capacitance value data received from one or more controllers across a sequence of sampling periods in any other suitable way to issue and handle proximity alarms.

11. Axis Controls

As described above, the process can enter a manual manipulation mode or a training mode when an object is in contact with a surface of the robotic arm 102; in the manipulation mode or a training mode, the processor 150 can unlock and/or actively drive various actuatable axes within the robotic arm 102 according to manual inputs on surfaces of the robotic arm 102.

In one example, a first arm segment connected to the base 110 at its posterior end via a first actuatable axis can include a set of chevron-shaped control electrodes patterned radially about its proximal end adjacent the first actuatable axis 124, as described above, and can include a set of sense electrodes patterned along its distal end. In this example, a second arm segment connected to the first arm segment 120 via a second actuatable axis can include a set of sense electrodes patterned along its proximal end adjacent the second actuatable axis 134 and can include a set of chevron-shaped control electrodes patterned radially about the distal end of the second arm segment 130, and a gripper-type end effector can be connected to the third actuatable (e.g., rotary-driven) axis and can include a set of jaws actuated (i.e., open and closed) by a fourth actuatable axis. In this example, the processor 150 can manipulate capacitance data collected from the sense electrodes on the first and second arm segments to detect proximity of an object to the robotic arm 102 and to adjust the speed and/or direction of each arm segment during execution of a prerecorded or predefined trajectory. Furthermore, in this example, the processor 150 can manipulate capacitance data collected from the set of control electrodes on the first arm segment 120: to lock the first actuatable axis 124 when an object remains in static contact with the proximal end of the first arm segment 120; to rotate the first actuatable axis 124 in a clockwise direction substantially in-sync with an object in contact with and sliding radially in a clockwise direction about the proximal end of the first arm segment 120; to rotate the first actuatable axis 124 in a counter-clockwise direction substantially in-sync with an object in contact with and sliding radially in a counter-clockwise direction about the proximal end of the first arm segment 120; to open the second actuatable axis 134 as an object contacting the proximal end of the first arm segment 120 moves toward the anterior end of the first arm segment 120; and to close the second actuatable axis 134 as an object contacting the proximal end of the first arm segment 120 moves toward the posterior end of the first arm segment 120.

Similarly, the processor 150 can manipulate capacitance data collected from the set of control electrodes on the second arm segment 130: to lock the third and fourth actuatable axes when an object remains in static contact with the distal end of the second arm segment 130; to rotate the third actuatable axis 184—and to therefore rotate the gripper-type end effector—in a clockwise direction substantially in-sync with an object in contact with and sliding radially in a clockwise direction about the distal end of the second arm segment 130; to rotate the third actuatable axis 184 in a counter-clockwise direction substantially in-sync with an object in contact with and sliding radially in a counter-clockwise direction about the distal end of the second arm segment 130; to open the fourth actuatable axis—and to therefore open the jaws of the gripper-type end effector—as an object contacting the distal end of the second arm segment 130 moves toward the anterior end of the second arm segment 130; and to close the fourth actuatable axis as an object contacting the distal end of the second arm segment 130 moves toward the posterior end of the second arm segment 130.

In another implementation, the robotic arm 102 includes: a set of arm segments arranged in series between the base 110 and the end effector 140; a first electrode arranged on one side of a final arm segment adjacent the end effector 140 (or end effector junction 182); and a second electrode arranged on the opposite side of the final arm segment adjacent the end effector 140. In this implementation, the processor 150 can implement methods and techniques described above to interpret changes in capacitance (or deviations from expected rates of change in capacitance) of a first sense circuit coupled to the first electrode 121 and of a second sense circuit coupled to the second electrode 131 to detect contact between external objects and surfaces of the final arm segment adjacent (e.g., over) the first and second electrodes, respectively. When a first input (i.e., contact with an external object) at the first sense circuit 122 and a second input at the second sense circuit 132—opposing the first input—are detected simultaneously, the processor 150 can interpret this pair of inputs as a grasping gesture on the final arm segment and enable manual control of one or more actuatable axes of the robotic arm 102 accordingly.

For example, the processor 150 can: detect a first contact between an object and a first region of the final arm segment adjacent the first electrode 121 in response to a rate of change in capacitance of the first sense circuit exceeding a contact threshold rate of change—greater than a proximity threshold rate of change—indicating that an external object has contacted the final segment of the arm adjacent the first electrode 121. In particular, mechanical contact between an external object and the arm segment adjacent the first electrode 121 can bleed current from the first electrode 121 at a greater rate than when the object is near but not in contact with the arm segment, and the processor 150 can detect contact with an external object based on this rate of change in capacitance of the first sense circuit. In this example, at approximately the same time, the processor 150 can implement similar methods and techniques to detect a second contact between an object and a second region of the final arm segment adjacent the second electrode 131 in response to rate of change in capacitance of the second sense circuit 132 exceeding the contact threshold rate of change. The processor 150 can then: interpret the first contact and the second contact—occurring over similar periods of time—as a manual control gesture to control an actuatable axis coupled to the final arm segment; and unlock the first actuatable axis 124 according to the manual control gesture. In this example, the processor 150 can unlock the actuatable axis coupled to the final arm segment opposite the end effector 140 to enable the operator to pivot the final arm segment relative to other arm segments and the base 110.

In the foregoing example, the system 100 can also include a third electrode coupled to a third sense circuit and arranged on the final arm segment between the first region electrode and the second electrode 131. The processor 150 can implement methods and techniques as described above to detect a third contact between an object and a third region of the final arm segment adjacent the third electrode in response to rate of change in capacitance of the third circuit exceeding the contact threshold rate of change. The process can then:

interpret the first contact, the second contact, and the third contact as an extended manual control gesture to control multiple actuatable axes within the robotic arm 102, such as both the first actuatable axis 124 between the final arm segment and a second arm segment and a second actuatable axis between the second arm segment 130 and a third arm segment 180; and unlock these actuatable axes (e.g., the first actuatable axis 124 and the second actuatable axis 134) according to this extended manual control gesture.

However, the processor 150 can manipulate the robotic arm 102 in any other suitable way based on inputs on surfaces of the robotic arm 102 during execution of a manual manipulation mode or a training mode.

The system 100s and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for controlling a robotic arm, the method comprising:
   moving the robotic arm through a trajectory;
   at a first time in which the robotic arm occupies a first position along the trajectory, measuring a first capacitance of a first sense circuit comprising a first electrode extending over a first arm segment of the robotic arm;
   at a second time in which the robotic arm occupies a second position along the trajectory, the second time succeeding the first time, measuring a second capacitance of the first sense circuit;
   calculating a first rate of change in capacitance of the first sense circuit based on a difference between the first capacitance and the second capacitance;
   transforming the first rate of change in capacitance of the first sense circuit into a speed of the first electrode relative to an external object;
   in response to the first rate of change in capacitance of the first sense circuit exceeding a threshold rate of change and in response to the speed of the first electrode relative to an external object approximating a speed of the robotic arm from the first position to the second position, issuing a proximity alarm for motion toward a static object; and
   reducing a current speed of the robotic arm moving through the trajectory to a fraction of a maximum speed of the robotic arm while the proximity alarm for motion toward a static object is current.

2. The method of claim 1, wherein measuring the first capacitance of the first sense circuit comprises measuring a resonant frequency of the first sense circuit at the first time; wherein measuring the second capacitance of the first sense circuit comprises measuring a resonant frequency of the second sense circuit at the second time; and wherein calculating the first rate of change comprises calculating a first rate of change in resonant frequency of the first sense circuit based on a difference between the first resonant frequency and the second resonant frequency.

3. The method of claim 1:
   further comprising calculating a second rate of change in capacitance of a second sense circuit between the first time and a second time, the second sense circuit comprising a second electrode extending over the first arm segment of the robotic arm, adjacent the first electrode, and defining a second area less than a first area defined by the first electrode;
   wherein issuing the proximity alarm comprises:
      in response to the first rate of change exceeding the threshold rate of change and the threshold rate of change exceeding the second rate of change, issuing a first proximity alarm for proximity of an external object within a first proximity range of the robotic arm, the first proximity range corresponding to a first sensible range of the first electrode; and
      in response to the first rate of change and the second rate of change exceeding the threshold rate of change, issuing a second proximity alarm for proximity of an external object within a second proximity range of the robotic arm, the second proximity range corresponding to a second sensible range of the second electrode; and
   wherein reducing the current speed of the robotic arm comprises:
      reducing the current speed of the robotic arm to a first fraction of the maximum speed of the robotic arm in response to the first proximity alarm; and
      reducing the current speed of the robotic arm to a second fraction of the maximum speed of the robotic arm in response to the second proximity alarm, the second fraction less than the first fraction.

4. The method of claim 1, further comprising:
   at a third time, detecting first contact between an object and a first region of the first arm segment adjacent the first electrode based on a second rate of change in capacitance of the first sense circuit exceeding a second threshold rate of change, the second threshold exceeding the first threshold;
   at approximately the third time, detecting a second contact between an object and a second region of the first arm segment adjacent a second electrode coupled to a second sense circuit based on a third rate of change in capacitance of the second sense circuit exceeding the second threshold rate of change, the second region of the first arm segment opposite the first region of the first arm segment;
   interpreting the first contact and the second contact as a manual control gesture to control a first actuatable axis coupled to the first arm segment; and
   unlocking the first actuatable axis in response to the manual control gesture.

5. The method of claim 4, further comprising:
at approximately a fourth time, detecting a third contact between an object and a third region of the first arm segment adjacent a third electrode coupled to a third sense circuit based on a fourth rate of change in capacitance of the third sense circuit exceeding the second threshold rate of change, the third region of the first arm segment interposed between the first region and the second region of the first arm segment; and
interpreting the first contact, the second contact, and the third contact as a second manual control gesture to control the first actuatable axis and a second actuatable axis coupled to a second arm segment supporting the first arm segment; and
unlocking the first actuatable axis and the second actuatable axis in response to the second manual control gesture.

6. A system comprising:
a base;
a first arm segment;
a second arm segment interposed between the base and the first arm segment, coupled to the first arm segment via a first actuatable axis, and coupled to the base via a second actuatable axis;
an end effector coupled to an end of the first arm segment opposite the first actuatable axis;
a first electrode arranged across a region of the first arm segment and electrically coupled to a first sense circuit;
a controller configured to measure a first capacitance of the first sense circuit at a first time and to measure a second capacitance of the first sense circuit at a second time during actuation of the first actuatable axis and the second actuatable axis, the second time succeeding the first time;
a processor configured to:
actuate the first actuatable axis and the second actuatable axis to move the end effector from a first position in physical space at the first time to a second position in physical space at the second time;
calculate a first rate of change in capacitance of the first sense circuit between the first time and the second time;
issue a proximity alarm at the second time in response to the first rate of change in capacitance of the first sense circuit exceeding a threshold rate of change; and
reduce a maximum actuation speed of the first actuatable axis and the second actuatable axis in response to the proximity alarm.

7. The system of claim 6, wherein the controller is configured to measure capacitance of the first sense circuit by sensing a resonant frequency of the first sense circuit.

8. The system of claim 6:
wherein the first electrode is arranged across a dorsal side of the first arm segment; and
wherein the processor is configured to:
issue the proximity alarm for motion in a first direction normal to the dorsal side of the first arm segment in response to the first rate of change in capacitance of the first sense circuit exceeding the threshold rate of change; and
reduce the maximum actuation speed of the first actuatable axis in a direction that moves the first arm segment in the first direction in response to the proximity alarm.

9. The system of claim 6:
further comprising a second electrode arranged across a lateral side of the first arm segment and coupled to a second sense circuit; and
wherein the processor is configured to:
issue a second proximity alarm for motion in a second direction normal to the lateral side of the first arm segment in response to a rate of change in capacitance of the second sense circuit exceeding the threshold rate of change; and
reduce the maximum actuation speed of the second actuatable axis in a direction that moves the first arm segment in the second direction in response to the second proximity alarm.

10. The system of claim 6:
further comprising:
a second electrode arranged on a first side of the first arm segment between the end effector and the first electrode and electrically coupled to a second sense circuit; and
a third electrode arranged on a second side of the first arm segment opposite the second electrode and electrically coupled to a third sense circuit;
wherein the controller is configured to measure capacitances of the second sense circuit and the third sense circuit; and
wherein the processor is further configured to unlock the first actuatable axis for manual manipulation in response to a first change in capacitance of the second sense circuit indicating contact between an external object and the first side of the first arm segment at a third time and in response to a second change in capacitance of the third sense circuit indicating contact between an external object and the second side of the first arm segment at approximately the third time.

11. The system of claim 6, further comprising a third arm segment interposed between the second arm segment and the base, coupled to the second actuatable axis on a first end, and coupled to the base at a second end opposite the first end via a third actuatable axis.

12. The system of claim 6:
wherein the first arm segment comprises:
a rigid beam extending from the first actuatable axis; and
a cover arranged over and extending along the rigid beam; and
wherein the first electrode comprises a conductive material arranged across the cover and is electrically coupled to the first sense circuit arranged within the first arm segment.

13. The system of claim 12, wherein the first arm segment further comprises a ground electrode arranged on the cover under the first electrode; and wherein the controller drives the ground electrode to a reference electric ground potential.

14. The system of claim 6:
further comprising:
a first ground electrode arranged on the first arm segment adjacent the first electrode and coupled to the first sense circuit;
a second electrode arranged across a region of the second arm segment and electrically coupled to a second sense circuit; and
a second ground electrode arranged on the first arm segment adjacent the first electrode and coupled to the first sense circuit;
wherein the controller is configured to sequentially drive the first electrode and the second electrode to measure a capacitance between the first electrode and the first ground electrode and to measure a capacitance between the second electrode and the second ground electrode, respectively.

15. The system of claim 6, wherein the end effector comprises a motorized gripper transiently coupled to the end of the second arm opposite the second actuatable axis.

16. A method for controlling a robotic arm, the method comprising:
moving the robotic arm through a trajectory;
at a first time in which the robotic arm occupies a first position along the trajectory, measuring a first capacitance of a first sense circuit comprising a first electrode extending over a first arm segment of the robotic arm;
at a second time in which the robotic arm occupies a second position along the trajectory, the second time succeeding the first time, measuring a second capacitance of the first sense circuit;
calculating a first rate of change in capacitance of the first sense circuit based on a difference between the first capacitance and the second capacitance;
transforming the first rate of change in capacitance of the first sense circuit into a speed of the first electrode relative to an external object;
in response to the speed of the first electrode relative to an external object exceeding a speed of the robotic arm from the first position to the second position, issuing a proximity alarm for motion of a dynamic object toward the robotic arm; and
ceasing motion of the robotic arm while the proximity alarm for motion of a dynamic object toward the robotic arm is current.

17. A method for controlling a robotic arm, the method comprising:
moving the robotic arm through a trajectory by actuating a first actuatable axis interposed between a first arm segment and a second arm segment of the robotic arm and actuating a second actuatable axis interposed between the second arm segment and a base of the robotic arm;
at a first time in which the robotic arm occupies a first position along the trajectory, measuring a first capacitance of a first sense circuit comprising a first electrode extending over a first arm segment of the robotic arm;
at a second time in which the robotic arm occupies a second position along the trajectory, the second time succeeding the first time, measuring a second capacitance of the first sense circuit;
calculating a first rate of change in capacitance of the first sense circuit based on a difference between the first capacitance and the second capacitance;
calculating a second rate of change in capacitance of a second sense circuit between the first time and a second time, the second sense circuit comprising a third electrode extending over the second arm segment;
in response to one of the first rate of change in capacitance and the second rate of change in capacitance exceeding a threshold rate of change, issuing a proximity alarm; and
in response to the proximity alarm, setting a reduced maximum speed of rotation of the first actuatable axis and the second actuatable axis in response to the proximity alarm.

18. The method of claim 17, further comprising, at an initial time preceding the first time:
moving the robotic arm through a capacitance mapping route;
recording a set of absolute capacitance values of the first sense circuit at discrete waypoints along the capacitance mapping route;
transforming the set of absolute capacitance values into relative capacitance value changes between the discrete waypoints along the capacitance mapping route;
aggregating the relative capacitance value changes into a baseline capacitance map of a physical space occupied by the robotic arm; and
calculating the threshold rate of change between the first position and the second position from the baseline capacitance map and a speed of the robotic arm between the first position and the second position.

19. The method of claim 18:
wherein moving the robotic arm through a trajectory comprises moving the robotic arm through the trajectory approximating the capacitance mapping route;
wherein recording the set of absolute capacitance values of the first sense circuit comprises recording the set of absolute capacitance values of the first sense circuit at a set of discrete waypoints along the capacitance mapping route, the set of discrete waypoints comprising the first position and the second position; and
wherein issuing the proximity alarm comprises detecting a change in the physical space, occupied by the robotic arm, between the initial time and the second time in response to the first rate of change in capacitance of the first sense circuit exceeding the threshold rate of change and issuing the proximity alarm based on the change in the physical space.

20. A system comprising:
a base;
a first arm segment;
a second arm segment interposed between the base and the first arm segment, coupled to the first arm segment via a first actuatable axis, and coupled to the base via a second actuatable axis;
an end effector coupled to an end of the first arm segment opposite the first actuatable axis;
a first electrode arranged across a region of the first arm segment and electrically coupled to a first sense circuit;
a second electrode arranged on a first side of the first arm segment between the end effector and the first electrode and electrically coupled to a second sense circuit; and
a third electrode arranged on a second side of the first arm segment opposite the second electrode and electrically coupled to a third sense circuit;
a controller configured to measure capacitance of the first sense circuit, the second sense circuit, and the third sense circuit during actuation of the first actuatable axis and the second actuatable axis; and
a processor configured to unlock the first actuatable axis for manual manipulation in response to a first change in capacitance of the second sense circuit indicating contact between an external object and the first side of the first arm segment at a third time and in response to a second change in capacitance of the third sense circuit indicating contact between an external object and the second side of the first arm segment at approximately the third time.

* * * * *